(12) United States Patent
Ishii

(10) Patent No.: US 10,067,743 B2
(45) Date of Patent: Sep. 4, 2018

(54) ARITHMETIC PROCESSING DEVICE AND CONTROL METHOD THEREOF

(71) Applicant: FUJITSU LIMITED, Kawasaki-shi, Kanagawa (JP)

(72) Inventor: Hiroyuki Ishii, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 45 days.

(21) Appl. No.: 15/458,074

(22) Filed: Mar. 14, 2017

(65) Prior Publication Data

US 2017/0300298 A1    Oct. 19, 2017

(30) Foreign Application Priority Data

Apr. 13, 2016    (JP) ................................ 2016-080227

(51) Int. Cl.
*G06F 7/38* (2006.01)
*G06F 12/0804* (2016.01)
*G06F 12/0811* (2016.01)
*G06F 12/0815* (2016.01)
*G06F 12/084* (2016.01)
*G06F 12/0842* (2016.01)

(52) U.S. Cl.
CPC .............. *G06F 7/38* (2013.01); *G06F 12/084* (2013.01); *G06F 12/0804* (2013.01); *G06F 12/0811* (2013.01); *G06F 12/0815* (2013.01); *G06F 12/0842* (2013.01); *G06F 2212/1008* (2013.01); *G06F 2212/1016* (2013.01); *G06F 2212/62* (2013.01)

(58) Field of Classification Search
CPC .............. G06F 12/084; G06F 12/0842; G06F 2212/1008; G06F 2212/62–2212/621

USPC .......................................... 711/130, 141, 210
See application file for complete search history.

(56) References Cited

U.S. PATENT DOCUMENTS

| | | | |
|---|---|---|---|
| 2006/0129763 A1* | 6/2006 | Royer, Jr. | ............ G06F 12/0866 711/118 |
| 2009/0198694 A1* | 8/2009 | Thomas | .................. G06F 9/466 |
| 2014/0331013 A1 | 11/2014 | Ishii et al. | |

FOREIGN PATENT DOCUMENTS

WO         2013084314         6/2013

* cited by examiner

*Primary Examiner* — Matthew Sandifer
(74) *Attorney, Agent, or Firm* — Fujitsu Patent Center

(57) ABSTRACT

An arithmetic processing device includes arithmetic processing cores, and a control circuit that includes a request port accepting a request for a memory space; a processing circuit unit that executes processing of the request; a control pipeline that determines whether or not the processing is executable by the processing circuit unit on the request input through the request port, and that executes first abort processing for the request when the processing is not executable on the request, and issues the processing to the processing circuit unit when the processing is executable; and an identical-address request arbitration circuit that holds an occurrence order of requests with an identical address that is aborted due to the processing being not executable, and that executes second abort processing on those of requests input to the control pipeline which have the identical address and which are other than a leading request in the occurrence order.

14 Claims, 18 Drawing Sheets

FIG.14

WAITING REQUEST LIST W_list

| | W_valid | entry_id | ... | W_valid | entry_id |
|---|---|---|---|---|---|
| CORE/CACHE0 | W_valid | entry_id | ... | W_valid | entry_id |
| CORE/CACHE1 | W_valid | entry_id | ... | W_valid | entry_id |
| CORE/CACHE2 | W_valid | entry_id | ... | W_valid | entry_id |
| CORE/CACHE3 | W_valid | entry_id | ... | W_valid | entry_id |

WAITING REQUEST LIST W_list

| W_valid | core_id | entry_id |
|---------|---------|----------|
| W_valid | core_id | entry_id |
| W_valid | core_id | entry_id |
| W_valid | core_id | entry_id |
| W_valid | core_id | entry_id |
| W_valid | core_id | entry_id |
| W_valid | core_id | entry_id |
| W_valid | core_id | entry_id |
| ..... | | |

ARITHMETIC PROCESSING DEVICE AND CONTROL METHOD THEREOF

CROSS-REFERENCE TO RELATED APPLICATION

This application is based upon and claims the benefit of priority of the prior Japanese Patent Application No. 2016-080227, filed on Apr. 13, 2016, the entire contents of which are incorporated herein by reference.

FIELD

The present invention relates to an arithmetic processing device and a control method thereof.

BACKGROUND

An arithmetic processing unit or device (a CPU chip or a microprocessor; hereinafter simply referred to as a processor) includes caches at a plurality of levels in order to improve memory access performance. The processor includes a plurality of arithmetic processing sections, cores, or circuits (CPU cores; hereinafter referred to as cores). The cores occupy and utilize respective first-level caches (L1 caches) as private caches. The processor further has upper-level caches shared by a plurality of the cores.

The processor also has one or a plurality of highest-level caches (last level caches: LLCs; hereinafter referred to as LLCs) included in the shared caches, and may have coherency control sections or circuits located outside the LLCs to maintain coherency among the caches.

International Publication Pamphlet No. WO 2013/084314 describes a processor having multi-level caches.

SUMMARY

Each of the LLCs and the coherency control sections has a control pipeline circuit into which a request is introduced and a request processing unit or circuit that executes processing corresponding to the request. The request processing unit has a plurality of request processing circuits. The control pipeline performs determination on whether the input (introduced) request conflicts with the address of a request being processed, determination on contents of processing on the request, a resource determination on whether or not a circuit resource in the processing unit can be acquired, and the like. The control pipeline then requests the request processing circuits in the request processing unit to process the appropriate request.

Thus, when failing to start processing because a request introduced through a request port is involved in an address conflict or because the circuit resource is not acquirable for the request, control pipeline aborts and sends the request back to the request port. Therefore, the request is repeatedly aborted until, for example, started processing for another request with a conflicting address is completed. Requests with other addresses in the request port can be processed in the request processing unit before the aborted request is processed.

In the above-described configuration, the first request that successfully acquires the resource in the request processing unit is processed. Thus, when different requests with an identical address compete in acquiring the resource, processing is executed on a request that successfully acquires the resource at a timing when the request is introduced into the control pipeline. Thus, in some case, one request fails to acquire the resource and is repeatedly aborted, whereas another request acquires the resource in a timely manner and has the corresponding processing executed. As a result, the progress of processing is unbalanced among requesters or among requests.

One aspect of the present embodiment is an arithmetic processing device comprising: a plurality of arithmetic processing cores; and a first control circuit that controls a memory. The first control circuit includes: a request port that accepts a request for a memory space in the memory; a processing circuit unit that executes processing corresponding to the request; a control pipeline that determines whether or not the processing is executable by the processing circuit unit on the request input through the request port, and that executes first abort processing for the request when the processing is not executable on the request, and issues the processing to the processing circuit unit when the processing is executable; and an identical-address request arbitration circuit that holds an occurrence order of requests with an identical address that is aborted due to the processing being not executable, and that executes second abort processing on those of requests input to the control pipeline which have the identical address and which are other than a leading request in the occurrence order.

In the first aspect, when a plurality of requests with an identical address competes against one another, the requests are restrained from being subjected to unbalanced control.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a diagram illustrating a first variation of the waiting request list.

FIG. 15 is a diagram illustrating a second variation of the waiting request list.

DESCRIPTION OF EMBODIMENTS

Figure 1:
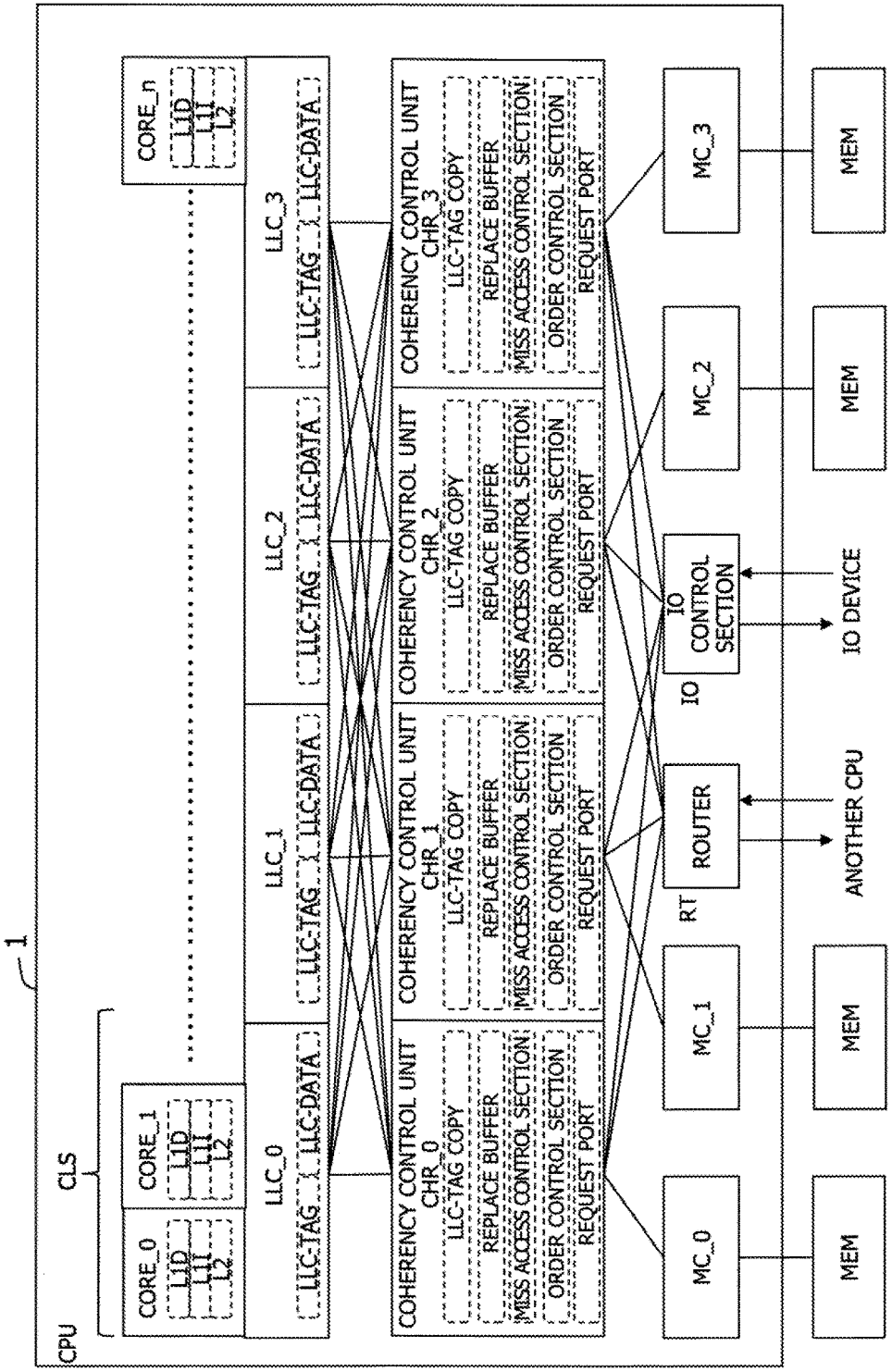
FIG. 1 is a diagram depicting a configuration example of a processor (CPU chip) in the present embodiment.

FIG. 1 is a diagram depicting a configuration example of a processor (CPU chip) in the present embodiment. A processor 1 has CPU cores (cores) CORE_0 to CORE_n each having an instruction control section (not depicted in the drawings) that decodes an instruction to issue arithmetic processing, an arithmetic processing circuit (not depicted in the drawings), a first-level (L1) data cache L1D, an L1 instruction cache L1I, and a second-level (L2) cache.

In the processor 1, the cores CORE_0 to CORE_n are divided into a plurality of groups (or clusters CLS), and a plurality of highest-level caches (LLC) LLC_0 to LLC_3 is provided in association with the respective groups. Each of the LLCs is shared by the plurality of cores in each group. Like normal caches, each of the LLCs has a tag memory and a data memory. The tag memory stores tag data (valid bits, addresses, statuses, and the like) relating to cache lines in the data memory.

The processor 1 also has coherency control sections or circuits CHR_0 to CHR_3 that maintain coherency among the plurality of LLCs and memory controllers MC_0 to MC_3 that control access to memories MEM.

Each of the coherency control sections has a copy of tags for the LLCs, request ports that accept memory requests from the LLCs and other CPUs and IO devices, and processing circuit units such as a miss access control section, an order control section, and a replace buffer that execute various types of processing allowing cache coherency to be maintained for different requests, as described below in detail.

Four memories MEM_0 to MEM_3 are address-interleaved. For example, when physical addresses in all memories have a size of k bits as expressed by PA[k−1:0], physical addresses in the four memories are as follows.

For MEM_0, PA[m:n]=00
For MEM_1, PA[m:n]=01
For MEM_2, PA[m:n]=10
For MEM_3, PA[m:n]=11

In these addresses, m and n are natural numbers smaller than k and larger than 0 (0<n<m<k).

Each of the coherency control sections CHR_0 to CHR_3 has a copy of the tags for the corresponding LLC. The LLC tag copies in the coherency control sections correspond to the above-described address interleave and store tag data on the cache lines in the corresponding LLCs at similar physical addresses.

The four LLCs are connected to the four coherency control sections CHR_0 to CHR_3, respectively, to issue, to the corresponding coherency control sections, memory requests requesting memory access as a result of cache misses. In contrast, the coherency control sections issue requests for processing needed for the input memory requests, as orders, to the four LLCs in a lower-level direction opposite to the memories.

Each of the four coherency control sections CHR issues requests for memory access or requests to write data in the cache back to the memory, to a memory controller MC located in an upper-level direction in which the memories are also located, the memory controller MC having corresponding addresses.

The processor 1 has a router RT that allows communication with the other CPUs and an IO control section IO that allows communication with IO devices.

Figure 2:
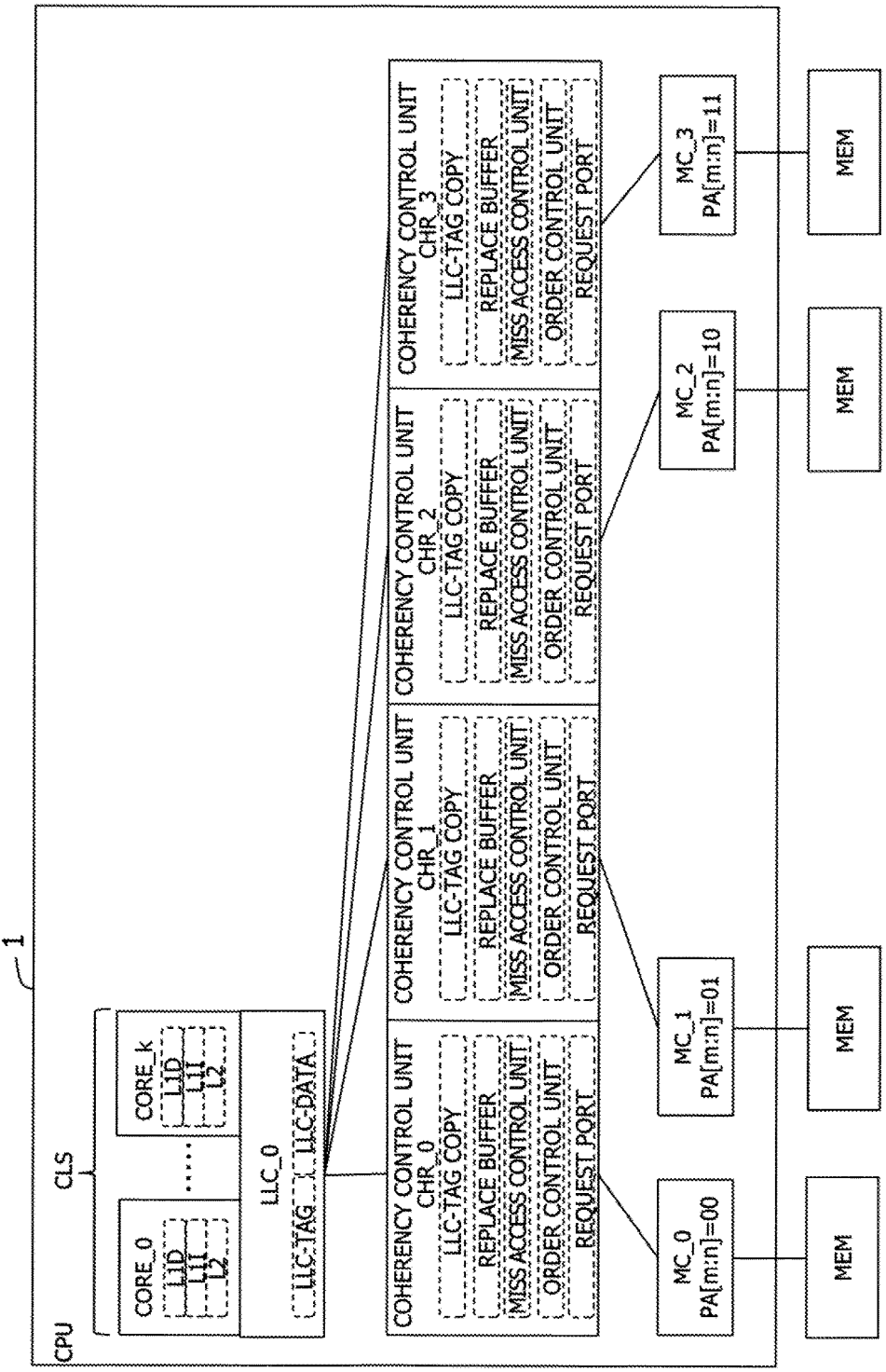
FIG. 2 is a diagram depicting one cluster and corresponding components extracted from the processor.

FIG. 2 is a diagram depicting one cluster and corresponding components extracted from the processor. The cores CORE_0 to CORE_n in FIG. 1 are divided into four clusters (core groups) CLS. Therefore, in FIG. 1, four LLCs (LLC_0 to LLC_3) are provided in association with the respective four clusters.

On the other hand, each cluster CLS depicted in FIG. 2 has a plurality of cores CORE_0 to CORE_k. The plurality of cores in the cluster CLS shares one LLC (LLC_0).

As described for FIG. 1, the four coherency control sections CHR_0 to CHR_3 correspond to the address-interleaved four memories MEM_0 to MEM_3 and corresponding four memory controllers MC_0 to MC_3 and are connected to the memories MEM_0 to MEM_3 via the memory controllers MC_0 to MC_3, respectively.

Therefore, each LLC (LLC_0) can issue memory requests to all the coherency control sections CHR_0 to CHR_3 and issue memory requests to the coherency control sections corresponding to the addresses in the memory requests.

With reference to FIG. 1 and FIG. 2, an operation example of the processor 1 will be described in brief. When any of the cores executes a load instruction to read data from the memory MEM to cause a cache miss in the L2 cache in the core, the L2 cache issues, to the LLC, a memory request to read data from the memory in association with the cache miss. When a cache miss further occurs in the LLC in connection with the memory request, the processor 1 issues a memory request to the coherency control section CHR corresponding to the address of the request.

The coherency control section searches for the LLC tag copy to check whether or not any of the remaining LLCs hold the data at the address. When a cache hit occurs, the coherency control section issues, to the LLC holding the data, an order to transfer the data held by the LLC to the requesting LLC having issued the memory request. When a cache miss occurs, the coherency control section issues, to the memory controller MC, a memory request requesting access to the memory. Upon receiving a data response from the memory, the coherency control section provides a data response with the received data to the requesting LLC having issued the memory request.

When the core executes the above-described load instruction or a store instruction, leading to write to the cache, the coherency control section issues a request for various types of processing based on an MESI protocol to the memory controller MC at an upper level as a request and to the LLC at a lower level as an order. The request and the order are both requests for certain processing but are distinguished from each other depending on the requestee for processing. The upper level means a direction toward a memory layer. The lower level means a direction toward caches or cores at a lower level.

[Requests to Addresses]

The caches L2, LLC and the coherency control section CHR each accept requests to addresses in the memory space and controls execution of processing corresponding to each request. The addresses in the memory space include (1) cacheable addresses in main memories MEM depicted in FIG. 1 and FIG. 2 and (2) non-cacheable addresses in memories for the system such as a boot ROM and an SRAM and registers for peripheral devices. However, the non-cacheable addresses may include some of the addresses in the main memories MEM.

Therefore, the requests (read or write) to certain addresses in the memory space include (1) requests to the cacheable addresses and (2) requests to the non-cacheable addresses. The requests to cacheable addresses include (1-1) requests issued as a result of cache misses in caches at a level lower than the level of the coherency control section such as the L2 cache in the local CPU or the LLC and (1-2) requests issued by IO devices (for example, dynamic memory access (DMA)) and the other CPUs (remote CPUs).

The above-described operation example of the processor CPU has been described in conjunction with the (1-1) requests. However, in addition to the (1-1) requests, the caches and the coherency control sections may accept the (1-2) or (2) requests to control processing.

[Summary of the Coherency Control Unit]

Figure 3:
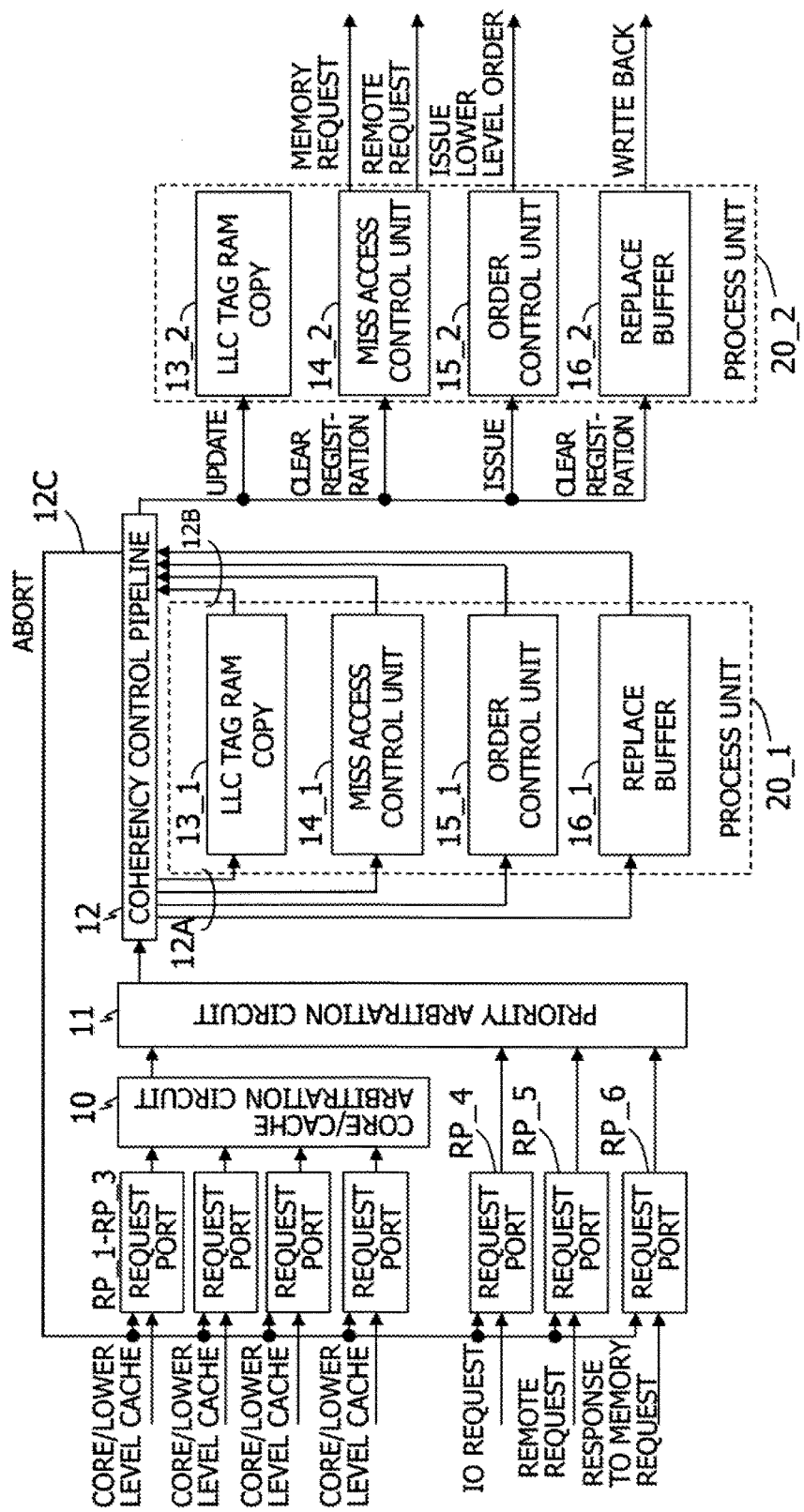
FIG. 3 is a diagram depicting a configuration example of the coherency control section.

FIG. 3 is a diagram depicting a configuration example of the coherency control section. The caches including the LLCs and the L2 caches have a configuration similar to that of the coherency control section. A configuration example of the coherency control section will be described below.

The cache coherency control section CHR has request ports RP_0 to RP_3 that accept requests from the lower-level caches and cores (the above-described clusters CLS). For the coherency control section, the lower-level caches are the LLCs. In an example in FIG. 1, four LLCs are provided, and four request ports RP_0 to RP_3 are provided in association with the respective requesting LLCs. Each request port RP has a plurality of entries and accepts a plurality of requests from the same requester at the plurality of entries.

The coherency control section further has, for example, a request port RP_4 that accepts IO requests from the IO devices, a request port RP_5 that accepts remote requests from the other CPUs, and a request port RP_6 that accepts responses to memory requests provided by the memory controllers. In this regard, unlike the coherency control section, each of the caches has a request port that accepts orders from the upper level and a request port that accepts memory responses from the upper level.

The coherency control section has an inter-core or -cache arbitration circuit 10 that selects one of the four request ports RP_0 to RP_3 and a priority arbitration circuit 11 that selects one of the selected request port and one of the other request ports RP_4-RP_6 based on priorities.

The coherency control section has the coherency control pipeline 12 into which the requests at the entries of the selected request port are introduced (input) and processing circuit units 20_1, 20_2 that execute various types of processing on the input request. FIG. 3 depicts the processing circuit unit as two separate sections 20_1, 20_2. However, the processing circuit unit is only depicted to be separated into the two sections in association with stages of internal processing, and the processing circuit units 20_1, 20_2 form one processing circuit unit. The processing circuit unit is configured to include a series of pipelines each time processing is to be executed.

The processing circuit unit 20 in the coherency control section has, for example, copies 13_1, 13_2 of the tag memory in the LLC, miss access control sections 14_1, 14_2, order control sections 15_1, 15_2, and replace buffers 16_1, 16_2. In this regard, the cache has its own data memory and a tag memory therefor instead of copies of the tag memory.

The copy 13 of the tag memory in the LLC is searched, by the coherency control pipeline 12, for the address of a request issued based on occurrence of a cache miss in the LLC at the lower level. Check is executed to see whether or not any of the other LLCs holds data. When response to the request is input through the request port RP_6 and the LLC updates the tag memory therein in accordance with the response, update processing is also executed on the copy 13 of the tag memory in the LLC.

The miss access control section 14 issues a memory request via the memory controller if the address of a memory request based on a cache miss in the LLC or the address of a request from the IO device or the remote CPU causes a cache miss in the copy 13 of the tag memory in the LLC. The miss access control section 14 issues a remote request to the memory of any other CPU if a local request as described above results in a cache miss. All of these requests are memory requests to the memory system. When issuing a request to the memory system, the miss access control section performs exclusive control so as to prevent acceptance of succeeding requests with an identical address as the issued request until the miss access control section receives a data response of the issued request from the memory system.

The order control section 15 issues a request to the cores or caches at the lower level, as an order. For example, when the address of a request from the lower level results in a cache hit in the copy 13 of the tag memory in the LLC, the order control section 15 issues an order to transfer the data, to the LLC holding the hit data. If one core stores data, the order control section 15 issues an order to execute cache invalidation on data held in the caches of the other cores in accordance with the MESI protocol in order to maintain coherency among the cores or caches at the lower level. In such a case, the order control section 15 performs exclusive control so as to prevent acceptance of succeeding requests with an identical address until the cache invalidation is completed.

The replace buffer 16 issues, to the memory controller, write-back that allows data pushed out of the lower-level cache to be written back to the memory. To maintain coherency, the replace buffer 16 performs exclusive control so as to prevent acceptance of succeeding requests with an identical address until a series of writes are completed.

The miss access control section 14, the order control section 15, and the replace buffer 16 each have acceptance entries (a type of registers) that accept requests for processing. The acceptance entries store information on the accepted request (including a request ID and a request address). When the processing sections in the processing circuit unit start processing corresponding to the request, new processing intended for the same address is controllably prevented from being accepted. The number of acceptance entries is finite, and new processing is prevented from being accepted so long as no acceptance entry is free. Such control is performed by the control pipeline 12.

Figure 4:
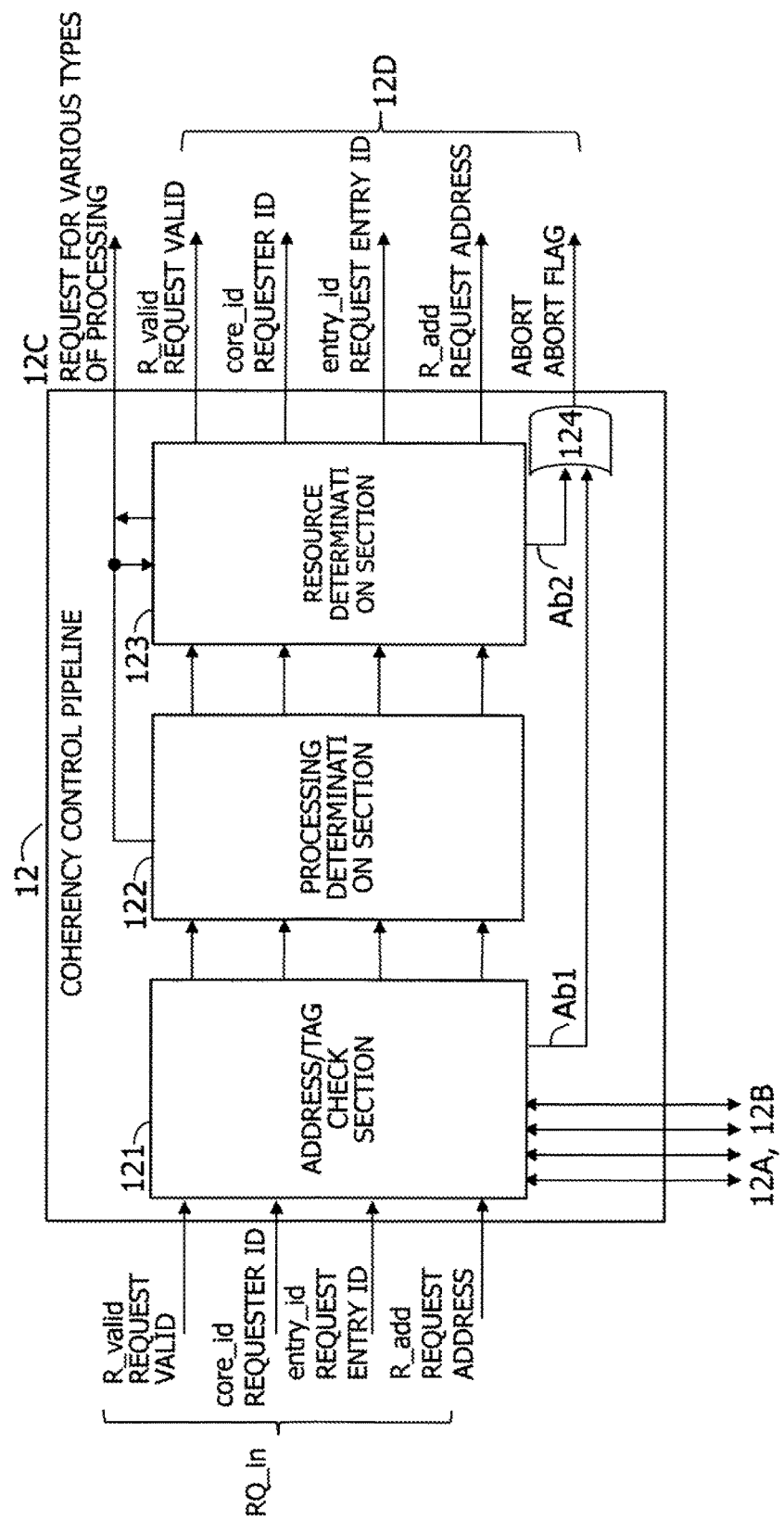
FIG. 4 is a diagram depicting a configuration example of the coherency control pipeline.

FIG. 4 is a diagram depicting a configuration example of the coherency control pipeline. The coherency control pipeline 12 determines whether or not the processing circuit unit 20 can execute processing on a request to an address, aborts the request if processing of the request is not executable, and issues processing corresponding to the request to the processing circuit unit 20 if the processing is executable. Whether or not the processing is executable corresponds to whether or not the address of the request conflicts with the address being processed, whether or not a circuit resource such as the acceptance entry of the processing section can be acquired, or the like. If the circuit resource can be acquired without any address conflict, the processing corresponding to the request can be executed. The request for which the processing has been issued is removed from the request port, whereas the aborted request is left in the request port and input again to (introduced into) the coherency control pipeline.

The coherency control pipeline 12 has an address/tag check section 121, a processing determination section 122, and a resource determination section 123. Information on the request (a request valid bit R_valid, a requester ID (core_id), a request entry ID (entry_id), and a request address R_id) is input to and flows through the coherency control pipeline.

Specific operations will be described. The address/tag check section 121 requests the tag memory copy 13_1 in the LLC to perform cache determination for the input request (12A), and requests the miss access control section 14_1, the order control section 15_1, and the replace buffer 16_1 to check whether or not the address of the input request matches the address (exclusive address) being processed by the processing sections 14, 15, 16 (12A). The address being processed is held at the above-described acceptance entry. Then, the address/tag check section acquires a cache determination result from the LLC tag memory copy (12B) and results of check of whether or not the address of interest matches the exclusive address of the miss access control section 14, the order control section 15, and the replace buffer 16 (12B). When the address of interest matches the exclusive address, the processing is not executable, and the address/tag check section 121 outputs a first abort signal Ab1.

The processing determination section 122 determines the processing needed for the memory request. The resource determination section 123 determines whether or not the circuit resource needed for the processing can be acquired in the miss access control section 14_2, order control section 15_2, and replace buffer 16_2 corresponding to the determined processing. An example of the circuit resource needed for the processing is the above-described acceptance entry. When the circuit resource is not acquirable, the resource determination section outputs a second abort signal Ab2 because the processing is not executable. When pipeline stall occurs for some reason, the processing is also not executable, and an abort signal not depicted in the drawings is output.

The coherency control pipeline outputs, through a logical OR gate 124, an abort flag ABORT resulting from a logical OR operation of all the abort signals Ab1, Ab2. The abort flag ABORT of "1" means that the request has been aborted, preventing execution of the processing corresponding to the request, which is sent back to the original access port.

When the processing is executable, the coherency control pipeline 12 issues processing request 12C determined by the processing determination section 122 to the processing circuit unit 20_2. The issued processing 12C may be, for example, update processing on the tag memory copy 13_2, entry registration or clear processing on the miss access control section 14_2, order issuance processing on the order control section 15_2, or an entry registration or clear request to the replace buffer 16_2.

In the above-described resource management, when acquisition of a resource for the processing fails, the introduced request is aborted and request information 12D with the abort flag ABORT is fed back to the request port, with the request sent back. The sent-back request is input again to the pipeline after the other requests in the request port. Specifically, the request port RP invalidates (removes) the requests entered into the request port in a case where the requester ID matches the request entry ID and where the abort flag ABORT is "0".

A described above, the coherency control pipeline executes pipeline processing on a request to an address, records the address being processed in the processing circuit unit 20, in the circuit resource such as the acceptance entry in the processing section, and controls the request so as to avoid a conflict with the same address. The processing in the processing circuit unit includes:

(1) update of the LLC tag copy 13_2 based on the status transition of the cache such as the MESI protocol, (2) processing of all requests issued to the system such as requests issued to the memory layer by the miss access control section 14_2, requests to the remote CPUs, and IO requests to the IO devices, (3) issuance of orders to the lower level by the order control section 15_2, and (4) write-back to the memory by the replace buffer 16_2 in conjunction with push of data out of the lower-level cache.

Blocking control refers to control in which, while one request is being processed, no other request can be processed. Non-blocking control refers to control in which requests can be processed one after another. The coherency control pipeline in FIG. 1 and FIG. 2 performs non-blocking control. The coherency control pipeline is configured such that processing of references to and updates of various resources (the LLC tag copy or the acceptance entry register in the miss access control section, the order control section, and the replace buffer) are pipelined. If any request fails to be processed because the appropriate resource is locked, the coherency control pipeline aborts the request. The abort flag ABORT is added to the aborted request information 12D, which is then fed back and sent back to the request port. This enables overtaking of the request introduced into the pipeline so as to deviate from the appropriate order of the requests.

The non-blocking control performed by the coherency control pipeline results in unbalance of the progress of processing among the requesters of the requests or among the requests. That is, the request introduced into the pipeline obtains the right to execute processing, when the address of the request does not conflict with the address being processed and the request can acquires a processing target circuit resource. Therefore, when a plurality of requests competes for an identical address, all the requests are aborted and re-introduced into the pipeline. However, a request introduced into the pipeline immediately after being unlocked in the processing section happens to acquire the circuit resource. Thus, when requests in particular request ports (requesters) are focused on, one requester fails to acquire the circuit resource and is aborted many times, whereas another requester having acquired the resource in a timely manner upon being introduced can execute the processing. This results in unbalance of the progress of processing among the requesters of the requests or among the requests.

For example, in an application with parallelized threads, a plurality of threads executes jobs, and when the final thread ends the job, the threads are synchronized in connection with the end of the jobs. In such a case, when unbalance of processing occurs among the threads, that is, among the cores, which are the requesters, the time until the end of the jobs is extended, deteriorating the overall processing performance.

A similar problem occurs in a cache control pipeline in the cache. Thus, a first embodiment will be described in which the identical-address request arbitration circuit is applied to the coherency control section, and a second embodiment will also be described in which the identical-address request arbitration circuit is applied to the cache.

First Embodiment

Figure 5:
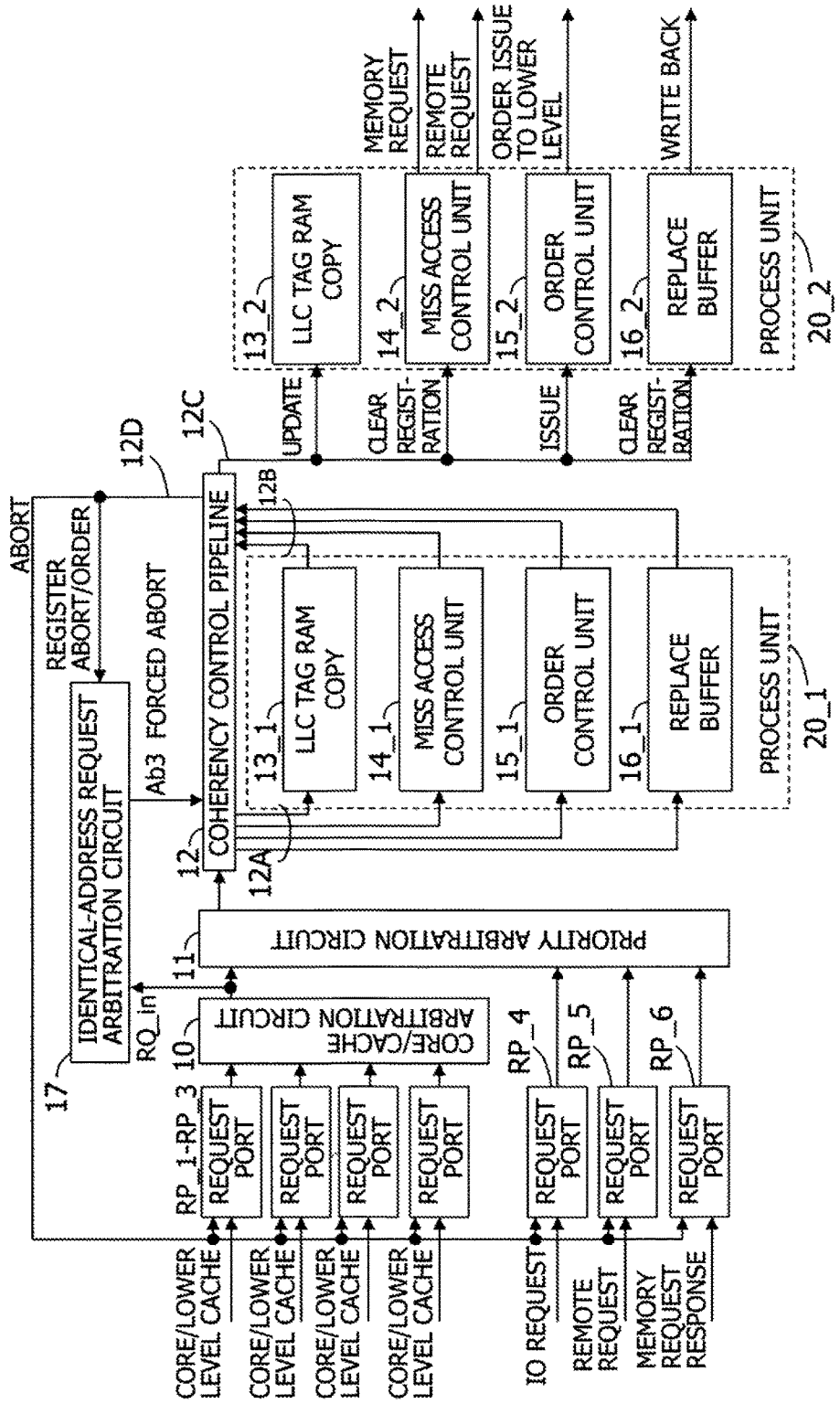
FIG. 5 is a diagram depicting a configuration example of the coherency control section in the first embodiment.

FIG. 5 is a diagram depicting a configuration example of the coherency control section in the first embodiment. The coherency control section in FIG. 5 has the identical-address request arbitration circuit 17 that arbitrates the order of acquisition of the circuit resource for processing execution among a plurality of requests with an identical address.

As described above, requests from the cores or the lower-level caches (LLCs) enter the request ports RP_0 to RP_3 provided for the respective requesters. One of the requests is selected by the inter-core or -cache arbitration circuit 10 and the priority arbitration circuit 11 and input (introduced) to the coherency control pipeline. Then, the coherency control pipeline 12 checks whether or not the circuit resource can be acquired from the processing circuit unit 20_2.

The identical-address request arbitration circuit 17 holds requests in a waiting request list that holds the order of input (introduction) of requests with the same address as the monitored address, until the request acquires the circuit resource from the processing circuit unit 20. When a memory request with the same address as the monitored address is input to the pipeline, the identical-address request arbitration circuit 17 issues a forced abort Ab3 of the request to the coherency control pipeline if the request is other than the leading request in the waiting request list. The request for which the forced abort has been issued is sent back to the request port. The leading request is not forcedly aborted, and is allowed to try to acquire the circuit resource through the control pipeline. Consequently, the identical-address request arbitration circuit 17 performs arbitration so that the processing corresponding to the request is executed according to the order in the waiting request list. The memory requests to the addresses other than the monitor target are not intended for the forced abort by the arbitration circuit.

In the configuration depicted in FIG. 5, the identical-address request arbitration circuit 17 receives a request RQ_in output by the inter-core or -cache arbitration circuit 10 and arbitrates only the requests from the cores or lower-level caches. However, as described below, IO requests or remote requests may be intended for arbitration. Requests for non-cacheable addresses not depicted in the drawings may also be intended for arbitration.

The identical-address request arbitration circuit 17 also receives the request information 12D output through the coherency control pipeline. The output request information includes the abort flag indicative of a result flowing through the pipeline. The abort flag indicates whether or not the request has succeeded in acquiring the circuit resource.

When the address of the input request matches the monitored address but the input request fails in matching the leading request in the waiting request list, the identical-address request arbitration circuit 17 issues a forced abort signal Ab3 and registers the forcedly aborted request in the waiting request list. However, the request is not registered if the request has already been registered. When the input request matches the leading request in the waiting request list (inevitably matches the monitored address), the identical-address request arbitration circuit 17 does not issue the forced abort Ab3 to the request and allows the request to try to acquire the circuit resource through the pipeline.

When the abort flag ABORT in the output request information 12D is "0" (the request has not been aborted and the circuit resource has successfully been acquired), if the request is registered in the waiting request list, the identical-address request arbitration circuit 17 removes the registration. The request for which the registration is removed is the leading request.

The configuration in FIG. 5 is the same as the configuration in FIG. 3 except for the identical-address request arbitration circuit 17.

Figure 6:
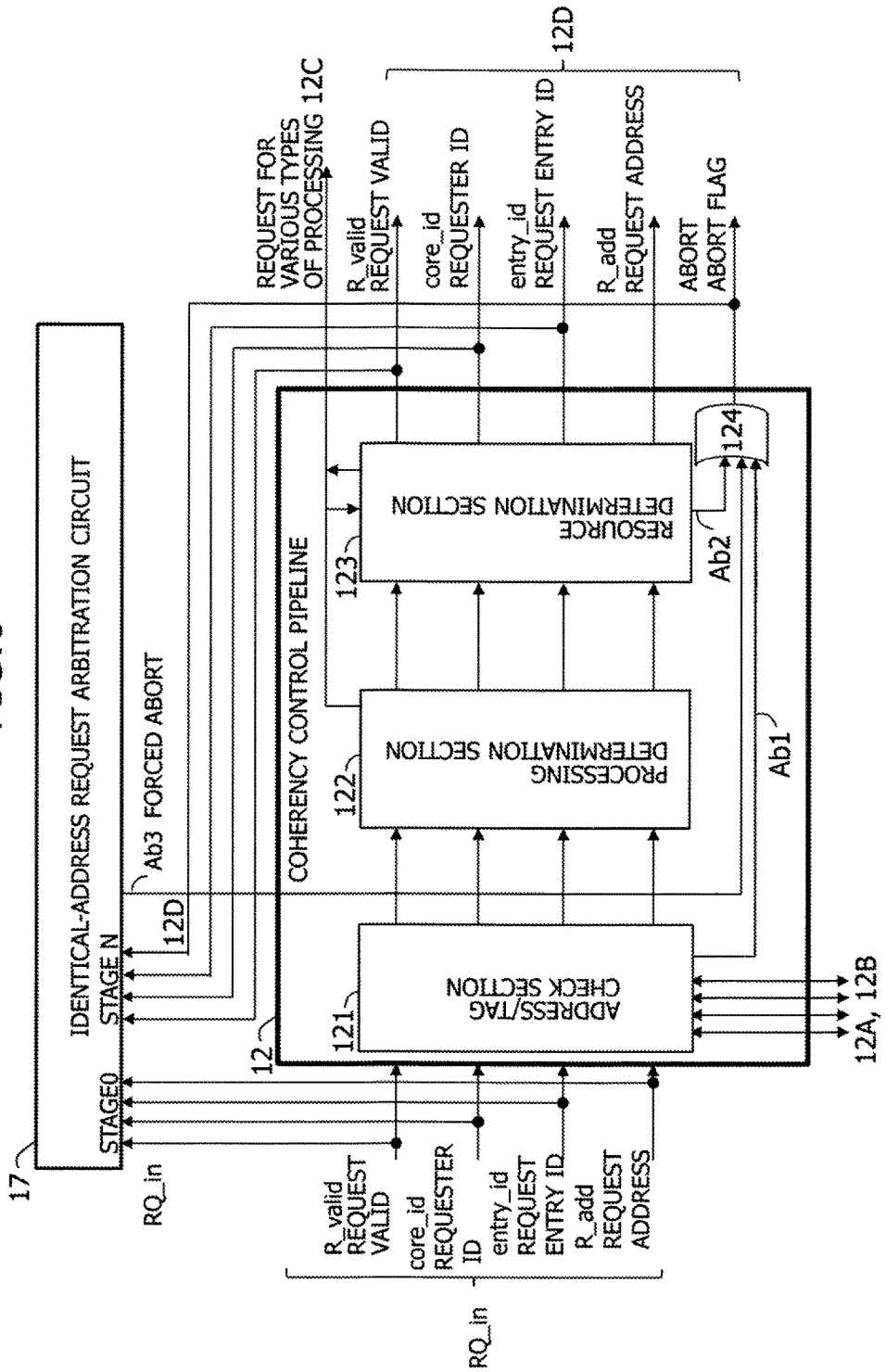
FIG. 6 is a diagram depicting a configuration of the coherency control pipeline 12 in the present embodiment.

FIG. 6 is a diagram depicting a configuration of the coherency control pipeline 12 in the present embodiment. A configuration in FIG. 6 is different from the configuration in FIG. 4 as follows. The identical-address request arbitration circuit 17 receives the input request information RQ_in input to the pipeline (a signal in a stage 0 of the pipeline) and the output request information 12D output from the pipeline (a signal in a final stage N of the pipeline). Then, the forced abort Ab3 issued by the identical-address request arbitration circuit 17 is input to the pipeline 12. The logical OR gate 124 outputs the result of a logical OR operation of the abort signals Ab1, Ab2 and the forced abort Ab3 issued in the pipeline, as the abort flag ABORT. The address/tag check section 121, the processing determination section 122, and the resource determination section 123 are equivalent to the address/tag check section 121, processing determination section 122, and resource determination section 123 in FIG. 4.

Therefore, in the present embodiment, not only when the circuit resource fails to be acquired which is needed for processing by the processing circuit unit 20 through the coherency control pipeline 12 (Ab1, Ab2) but also when the forced abort is executed by the identical-address request arbitration circuit 17 (Ab3), the request is aborted and sent back to the request port.

Figure 7:
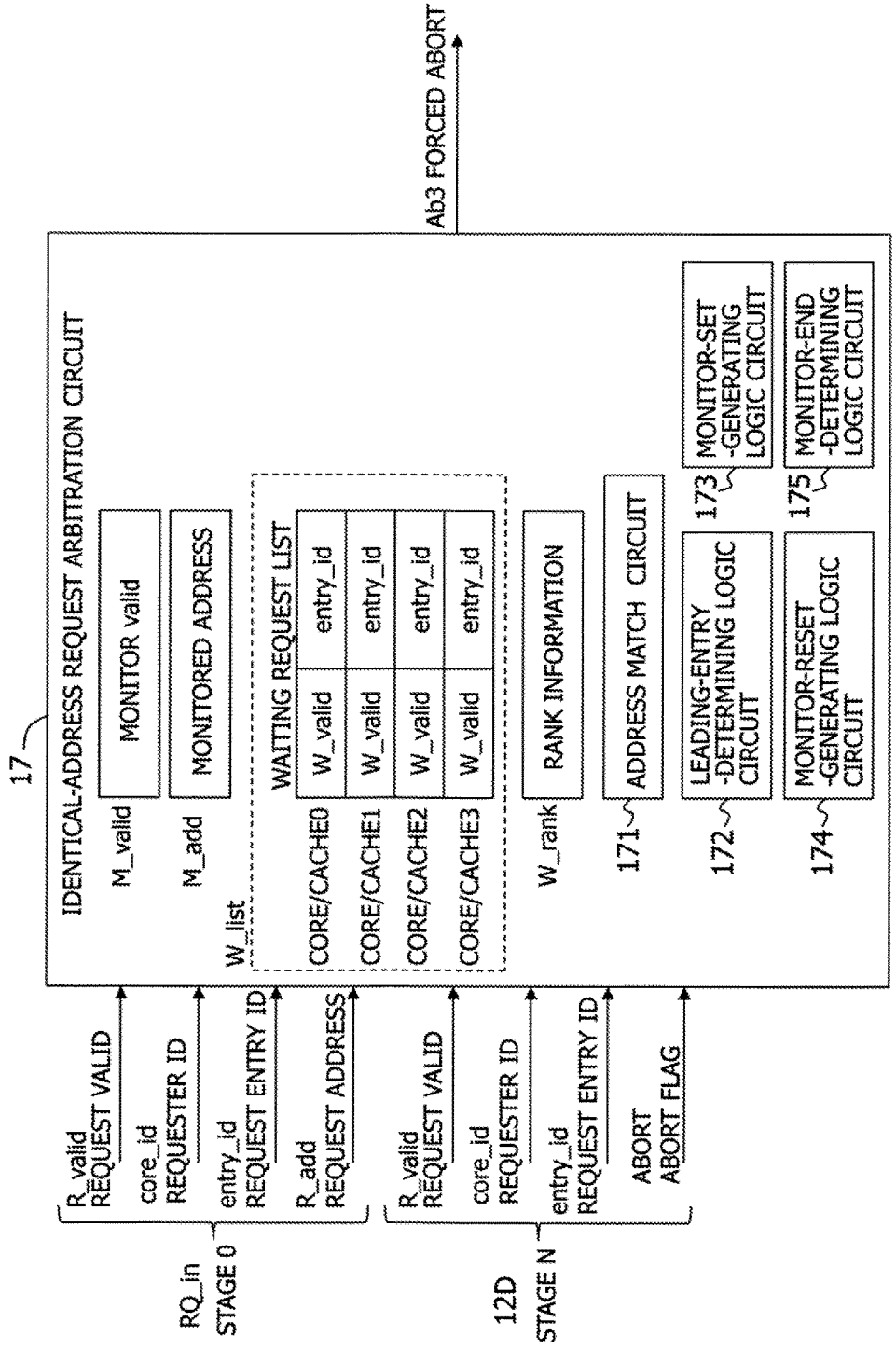
FIG. 7 is a diagram depicting information held in the identical-address request arbitration circuit 17 and main component circuits in the identical-address request arbitration circuit 17.

FIG. 7 is a diagram depicting information held in the identical-address request arbitration circuit 17 and main component circuits in the identical-address request arbitration circuit 17. The identical-address request arbitration circuit 17 holds, as held information, a monitor valid flag M_valid indicating whether or not a monitor circuit is in a monitor state, a monitored address M_add of the monitor target address, a waiting request list W_list and rank information W_rank that hold the order in which memory requests with the same address as the monitored address have arrived.

In an example in FIG. 7, the waiting request list W_list has one entry for each of the four requesters, the cores/caches 0 to 3, and the valid bit W_valid and the entry ID (entry_id) are stored in the entry. The ID of the requester and the entry ID allow all of the requests in the four request ports RP_0 to RP_3 to be identified. However, the waiting request list is not limited to this configuration as described below.

The identical-address request arbitration circuit has, as component circuits, an address match circuit 171 that compares the address R_add in the succeeding input request information with the monitored address M_add, a leading-entry-determining logic circuit 172 that determines whether or not the input request is the leading request in the waiting request list, a monitor-set-generating logic circuit 173 that generates a set signal registering a forcedly aborted memory request in the waiting request list when possible, a monitor-reset-generating logic circuit 174 that generates a reset signal removing the leading request in the waiting request list if a request that has not been aborted by the pipeline is the leading request, and a monitor-end-determining logic circuit 175 that determines whether the waiting request list is empty.

In FIG. 7, when a plurality of monitored addresses M_add is to be monitored, the identical-address request arbitration circuit 17 holds the monitored address M_add, the waiting request list W_list, the rank information W_rank for each monitored address.

Figure 8:
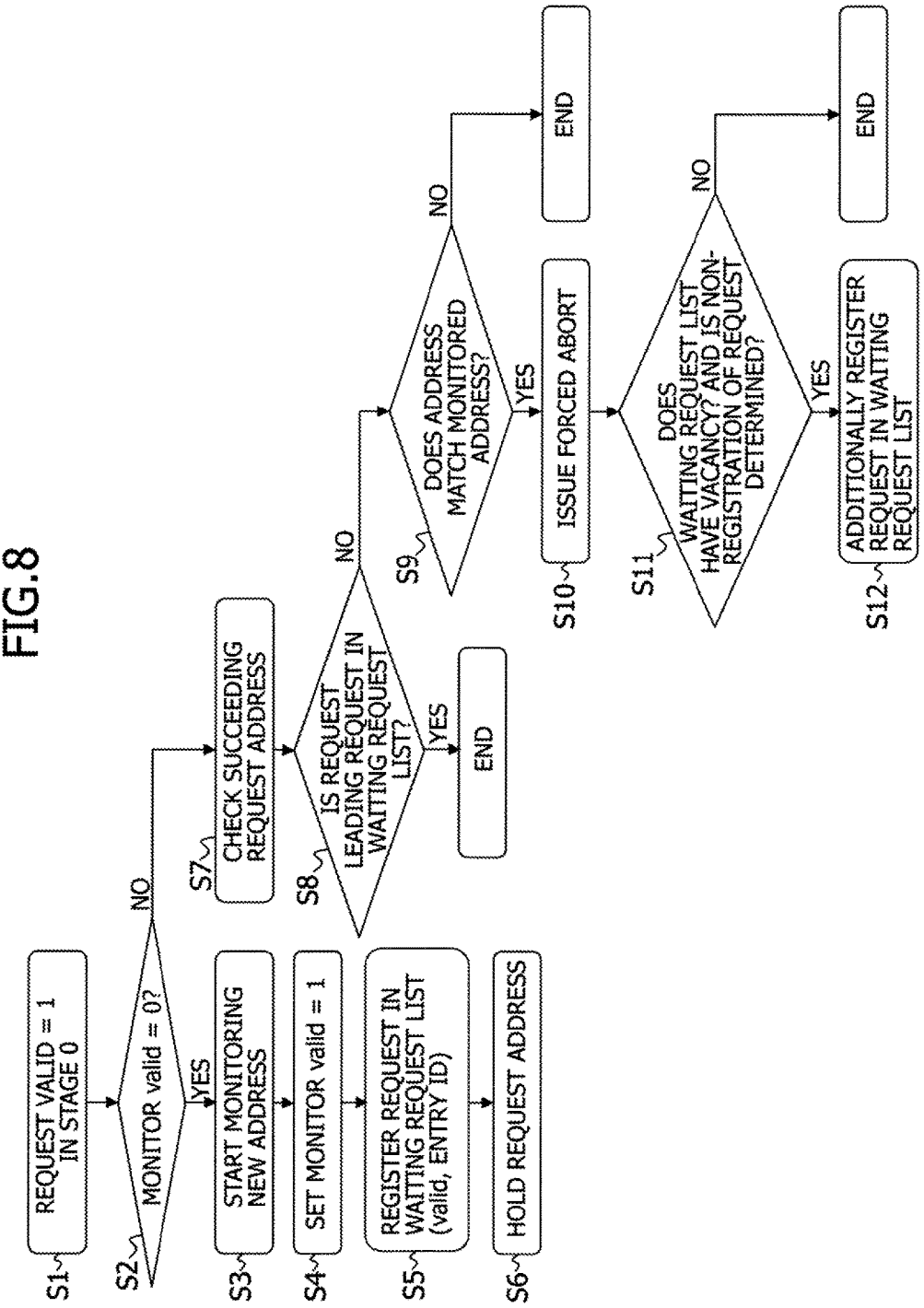
FIG. 8 is a flowchart illustrating processing on the input request information input to the identical-address request arbitration circuit.

FIG. 8 is a flowchart illustrating processing on the input request information input to the identical-address request arbitration circuit. In FIG. 8, the identical-address request arbitration circuit 17 has processing for newly registering a request input and the address thereof while the arbitration circuit is not monitoring any address, processing for additionally registering a request succeeding request with the same address, and processing for forcedly aborting succeeding requests with the same address other than the leading request in the waiting request list W_list.

The identical-address request arbitration circuit 17 first determines whether or not the monitor valid bit M_valid is indicative of a valid status (S2). The monitor valid bit M_valid of "0" indicates that address monitoring is not being executed and that a new address can be registered. When request information is input to the stage 0 of the pipeline 12 while the monitor valid bit M_valid is "0", monitoring of a new address is started (S3). The monitor valid bit M_valid is set to "1" (S4). The request is registered in the waiting request list W_list, and the order of rank information W_rank is updated (S5).

In the waiting request list, information may be recorded which allows identification of requests waiting to acquire the resource from the processing section and of the ranks thereof. Although the present embodiment is not limited to the waiting request list W_list and rank information W_rank illustrated in FIG. 7, in the example in FIG. 7, the waiting requests are managed based on the valid signal W_valid and entry ID (entry_id) held for each of the requesters of the requests in the waiting request list W_list, and the rank information W_rank. Specifically, the valid bit W_valid=1 and the request entry ID (entry_id) are registered in the entry of the requester ID in the input request information RQ_in for the stage 0 input to the pipeline, and the occurrence order of the waiting requests is registered in the rank information W_rank.

The identical-address request arbitration circuit 17 further registers the request address R_add in the input request information RQ_in in the monitored address M_add (S6). Subsequently, until the newly registered request acquires the circuit resource, the identical-address request arbitration circuit 17 performs arbitration by tracking other requests with the same address as the monitored address and issuing the forced abort Ab3 to the other requests to preclude the other requests from acquiring the circuit resource before the leading request.

If the monitor valid bit M_valid is "1" when a request is input to the pipeline 12, checks are executed to see whether or not the succeeding request is the leading request in the waiting request list and whether or not the succeeding request is identical to the monitored address (S7). First, the identical-address request arbitration circuit 17 determines whether or not the succeeding request is the same as the leading request in the waiting request list, based on the waiting request list W_list and the rank information W_rank (S8). When the succeeding request matches the leading request (in S8, YES), the succeeding request corresponds to the request waiting, at the leading position, for an opportunity to acquire the circuit resource. Consequently, the identical-address request arbitration circuit does not issue the forced abort to the request and thus provides the request with an opportunity to acquire the circuit resource.

When the succeeding request fails in matching the leading request (in S8, NO), the identical-address request arbitration circuit 17 checks whether or not the address R_add matches the monitored address M_add (S9). When the address R_add matches the monitored address M_add (in S9, YES), this means that the request conflicts with the monitored address and is not the request waiting at the leading position in the waiting request list. The identical-address request arbitration circuit 17 thus issues the forced abort Ab3 to the request (S10) to make acquisition of the circuit resource by the request inevitably fail in the pipeline, preventing the requests other than the leading request in the waiting request list from acquiring the circuit resource.

Then, if non-registration of the forcedly aborted request in the waiting request list is determined and the waiting request list has a vacancy (in S11, YES), the identical-address request arbitration circuit additionally registers the request in the waiting request list and updates the rank information (S12). When the determination in step S11 is NO, the request is not additionally registered in the waiting request list.

The waiting request list W_list in FIG. 7 allows only one entry to be registered for each requester in view of resource saving. In this case, step S11 may simply determine whether or not the waiting request list has a vacancy for the requester. Since the waiting request list has only one entry, a vacancy in the list means that the requester's request has not been registered. Another example of the waiting request list will be described below in detail.

When the succeeding request fails in matching the monitored address (in S9, NO), the forced abort is not issued to the request, and the control pipeline provides the request with an opportunity to acquire the circuit resource.

Figure 9:
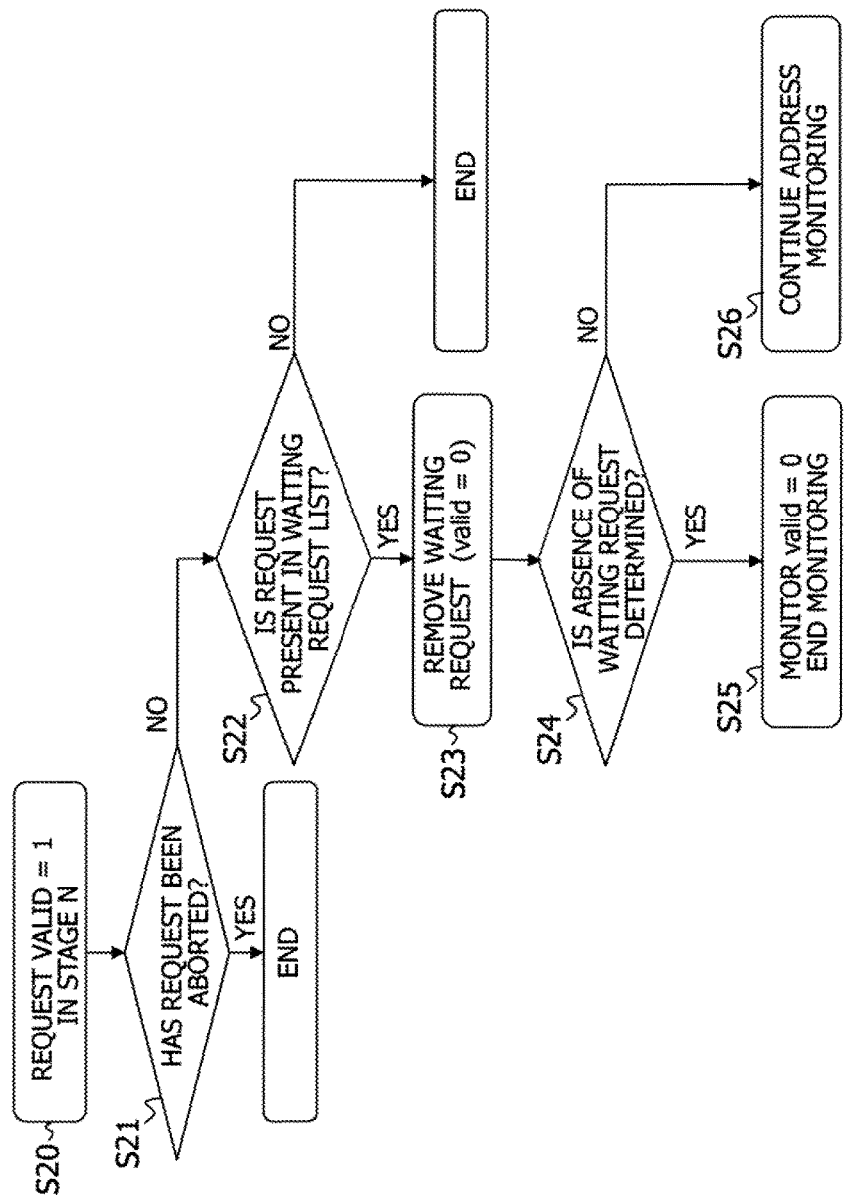
FIG. 9 is a flowchart illustrating processing on the output request information output from the identical-address request arbitration circuit.

FIG. 9 is a flowchart illustrating processing on the output request information output from the identical-address request arbitration circuit. The output request information (the request information in the final stage N) has the abort flag ABORT, indicating whether the request has been accepted and succeeded in acquiring the circuit resource or has failed to be accepted and has been aborted, in the coherency control pipeline 12. If the request is aborted (in S21, YES), the request is sent back to the request port, and the identical-address request arbitration circuit thus leaves the request in the waiting request list and continues monitoring the request.

If the request is not aborted (in S21, NO), the identical-address request arbitration circuit checks whether or not the request is present in the waiting request list W_list (S22). If the request is present in the waiting request list (in S22, YES), that is, if the request is the leading request in the waiting request list, the identical-address request arbitration circuit removes the request from the waiting request list and updates the rank information W_rank (S23). If the removal results in no request remaining in the waiting request list, in other words, if the absence of another request for access to the monitored address is determined (in S24, YES), the identical-address request arbitration circuit changes the monitor valid bit M_valid to "0" to end monitoring of requests with the monitored address (S25). If the absence of another request is not determined (in S24, NO), the identical-address request arbitration circuit continues monitoring requests with the monitored address without changing the monitor valid bit M_valid (S26).

[Specific Example of the Identical-Address Request Arbitration Circuit]

Specific operations of the identical-address request arbitration circuit 17 will be described. The specific operation examples include initial registration of a request, check and registration of succeeding requests, a clear operation for a waiting request, and an address monitor ending operation.

[Initial Registration Operation for a Request]

Figure 10:
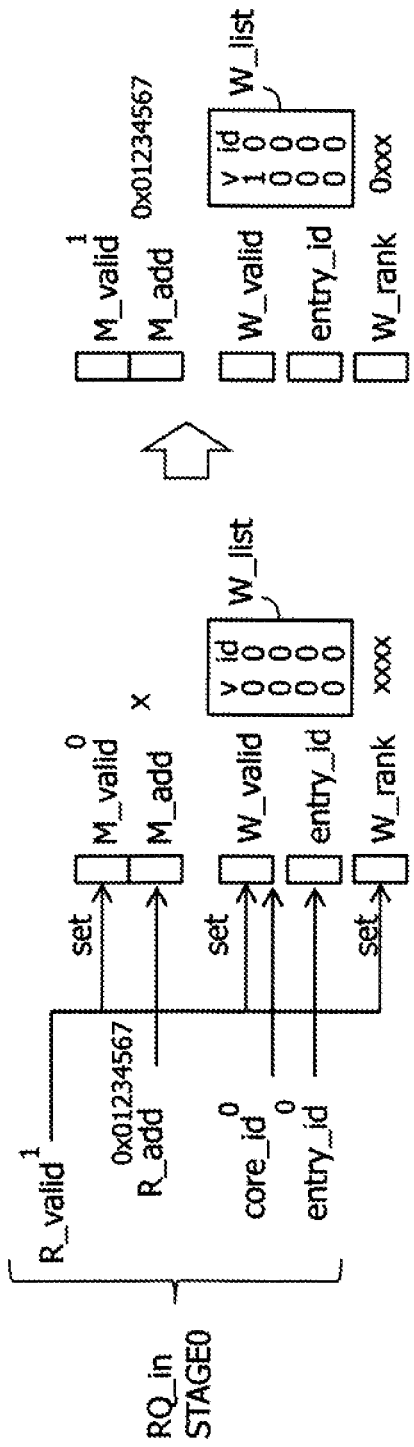
FIG. 10 is a diagram illustrating an operation for initial registration of a request which operation is performed by the identical-address request arbitration circuit 17.

FIG. 10 is a diagram illustrating an operation for initial registration of a request which operation is performed by the identical-address request arbitration circuit 17. FIG. 10 illustrates how the monitor valid bit M_valid, the monitored address M_add, the waiting request list W_list, and the rank information W_rank are updated based on the input request information RQ_in. Since the request is initially registered, the monitor valid bit M_valid is "0" (address monitoring is not being performed), the monitored address M_add has not been registered, the waiting request list W_list is empty, and the rank information W_rank is also empty.

If the monitor valid bit M_valid is "0" when the input request information RQ_in is input to the identical-address request arbitration circuit 17, address monitoring is not being performed, and the arbitration circuit thus newly registers the address of the input memory request and the like. That is, based on the request valid bit R_valid of "1" in the input request information RQ_in, the monitor valid bit M_valid is set to "1", the monitored address M_add is set to "0x1234567", the wait valid bit W_valid=1 and the entry ID (entry_id)=0 are registered in the entry of the requester 0 (the first raw) (core_id=0) in the waiting request list W_list, and the requester ID=0 is set in the leading entry in the rank information W_rank. As a result, the request input to the pipeline is registered in the identical-address request arbitration circuit 17, which subsequently monitors succeeding requests with the same address as the monitored address.

[Check and Registration Operation for Succeeding Requests]

Figure 11:
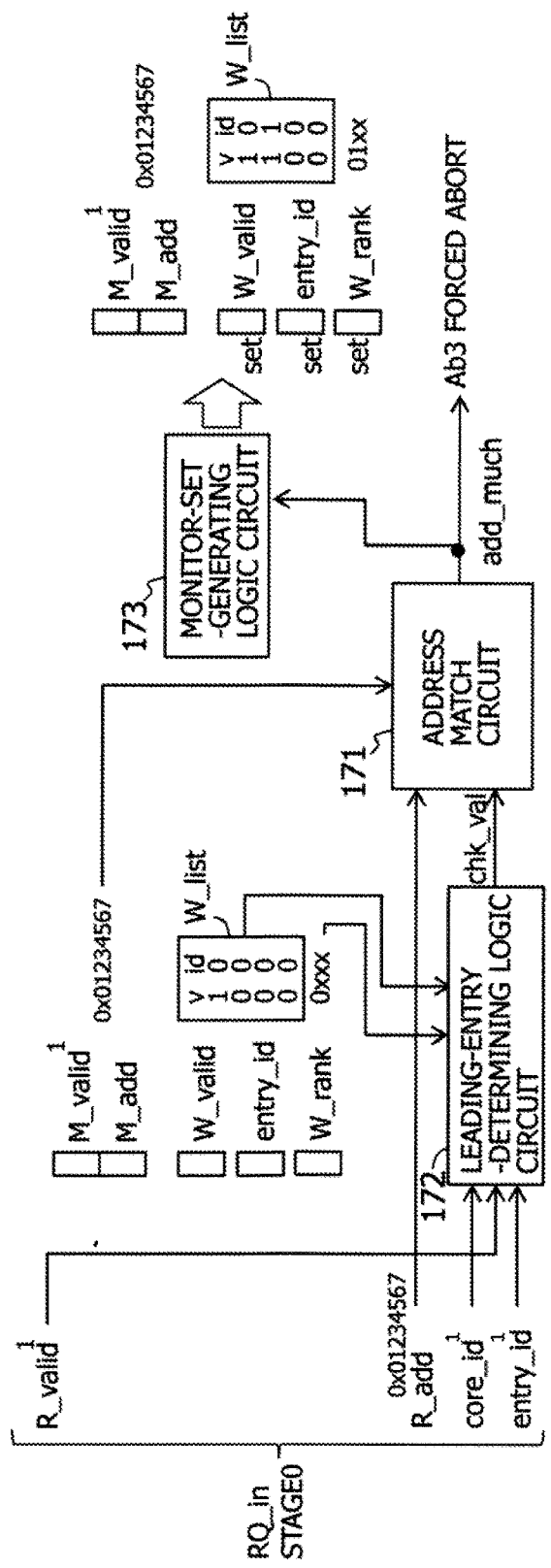
FIG. 11 is a diagram illustrating a check and registration operation for succeeding requests performed by the identical-address request arbitration circuit 17.

FIG. 11 is a diagram illustrating a check and registration operation for succeeding requests performed by the identical-address request arbitration circuit 17. In this example, the succeeding input request information RQ_in has a request address R_add of "0x1234567", which is the same as the monitored address M_add, the requester ID is core_id=1, and the entry ID is entry_id=1.

In the identical-address request arbitration circuit 17, the leading-entry-determining logic circuit 172 determines whether or not the succeeding request matches the leading request in the waiting request list. This determination corresponds to step S8 in FIG. 8. In this example, the requester ID (core_id), which is the leading request in the waiting request list W_list, is "0", and the entry ID (entry_id) is "0". Thus, the succeeding request does not match the leading request.

As a result, the leading-entry-determining logic circuit 172 sets an address check valid bit chk_val to "1", and allows the address match circuit 171 to determine whether or not the monitored address M_add matches the request address R_add of the succeeding request. This determination corresponds to step S9 in FIG. 8. In this example, the two addresses match, and the address match circuit 171 sets an address match signal add_match to "1", thus notifying the pipeline 12 of the forced abort Ab3. In other words, the succeeding request is not the leading request in the waiting request list, and the address of the succeeding request matches the monitored address. As a result, the identical-address request arbitration circuit 17 notifies the pipeline of the forced abort Ab3. Consequently, the succeeding request is forced to fail in acquiring the circuit resource.

The succeeding request to which the forced abort has been output is registered as a new waiting access in a case where the succeeding request is not registered in the waiting request list W_list and where a vacant entry is present in the waiting request list W_list. The identical-address request arbitration circuit 17 allows the monitor-set-generating logic circuit 173 to check whether or not to register the succeeding request in the waiting request list. This determination corresponds to step S11 in FIG. 8. If the entry of the requester of the succeeding request in the waiting request list is vacant, the identical-address request arbitration circuit 17 sets (registers) the valid bit W_valid of "1" and the entry ID (entry_id) of "1" in the request core, in the entry of the requester (the second raw) corresponding to the succeeding request in the waiting request list W_list. The identical-address request arbitration circuit 17 further sets the rank of the requester ID of "1" in the rank information W_rank to "1". As a result, the forcedly aborted succeeding request is registered as a second waiting request in the waiting request list.

In the example in FIG. 7, since the waiting request list has only one entry for each requester, in four entries in the rank information W_rank, in which the leftmost entry corresponds to the leading entry, requester IDs (core_id) of the corresponding ranks are stored. Therefore, in a state in FIG. 11, "0" and "1" are arranged in the rank information W_rank on the left and on the right, respectively, indicating that the leading requester ID is "0" and that the next requester ID is "1".

[Clear Operation for a Waiting Request]

Figure 12:
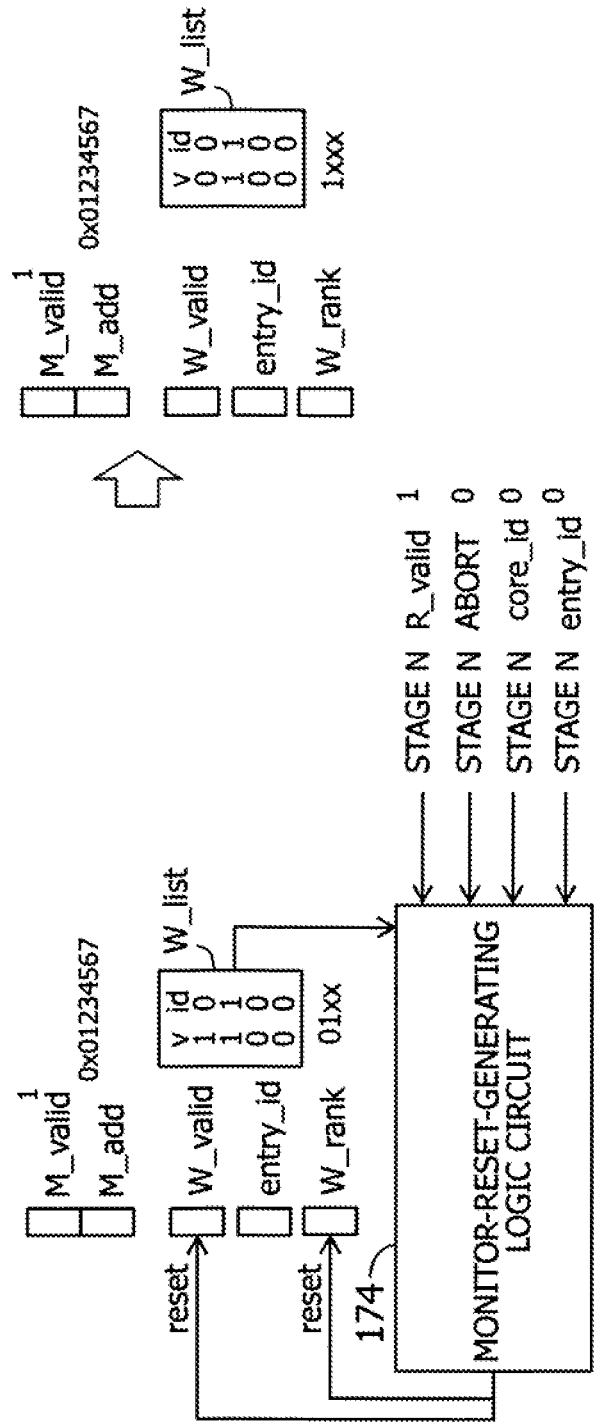
FIG. 12 is a diagram of a clear operation for a waiting request performed by the identical-address request arbitration circuit 17.

FIG. 12 is a diagram of a clear operation for a waiting request performed by the identical-address request arbitration circuit 17. If a request having passed through the pipeline is not aborted, this means that the request has succeeded in acquiring the circuit resource. Therefore, the request is removed from the waiting request list of the requests waiting to acquire the circuit resource and is cleared from the arbitration targets.

The identical-address request arbitration circuit 17 performs the clear operation for a waiting request based on the output request information (the request information in the final stage N of the pipeline) output through the pipeline. When the request valid bit R_valid in the output request information is "1" and the corresponding abort flag ABORT is "0" (the request has not been aborted), the monitor-reset-generating logic circuit 174 determines whether or not the requester ID (core_id) of "0" and the entry ID (entry_id) of "0" that identify the request are present in the waiting request list W_list. This determination corresponds to steps S20, S21 and S22 in FIG. 9.

Since the requests other than the leading request in the waiting request list are forcedly aborted, determination on whether the request not aborted is present in the waiting request list is the same as determination on whether or not the request is the leading request. When the request is determined to be present in the waiting request list, the monitor-reset-generating logic circuit 174 generates a reset signal that removes the leading request in the waiting request list W_list and that updates the rank information W_rank. In an example in FIG. 12, the entry with the requester ID of "0" in the waiting request list W_list is removed (the valid bit W_valid is changed to "0"), and the rank information W_rank is updated such that the requester ID of "1" is stored in the leading entry at the leftmost end. As a result, the request not aborted is cleared from the arbitration targets.

Although not depicted in FIG. 12, if the further succeeding request has the requester ID of "1" and the entry ID of "1" and is not aborted in the pipeline, the request is removed from the waiting request list and also cleared from the arbitration targets.

[Address Monitor Ending Operation]

Figure 13:
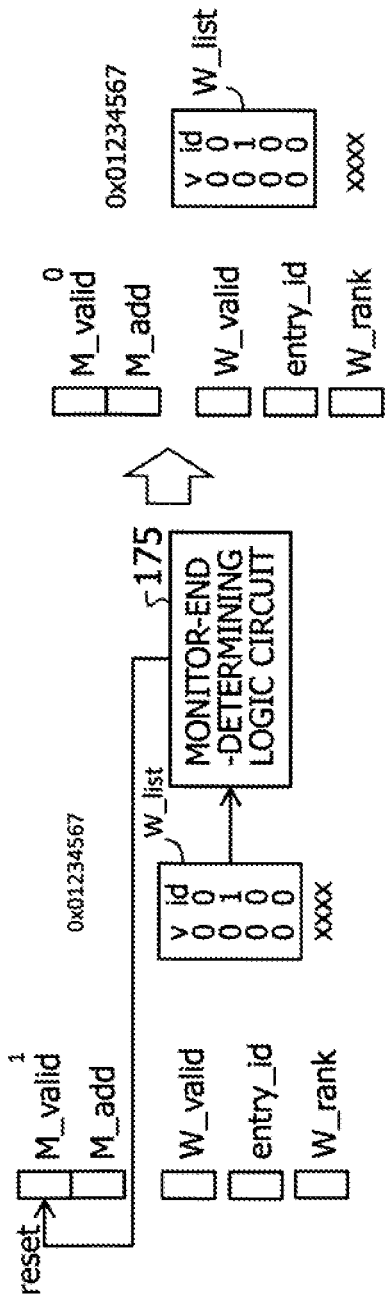
FIG. 13 is a diagram illustrating an operation for ending address monitoring which operation is performed by the identical-address request arbitration circuit 17.

FIG. 13 is a diagram illustrating an operation for ending address monitoring which operation is performed by the identical-address request arbitration circuit 17. Since, in FIG. 12, the request with the requester ID of "1" and the entry ID of "1" is not aborted in the pipeline, in FIG. 13, the valid bit W_valid of the requester ID of "1" in the waiting request list (on the second raw) is changed to "0". In other words, all the valid bit W_valid in the waiting request list are set to "0", and no waiting request is present.

The monitor-end-determining logic circuit 175 resets the monitor valid bit W_valid to "0" based on all the valid bits W_valid in the waiting request list being "0". As a result, the monitor valid bit M_valid is reset to "0", and the identical-address request arbitration circuit 17 ends the arbitration in which requests with the same address as the monitored address are monitored and in which the requests are allowed to acquire the circuit resource in order of occurrence of the requests.

In this state, when a new request is input to the pipeline, the arbitration operation among the requests is resumed for the monitored address registered during the operation for initial registration in FIG. 10.

FIG. 14 is a diagram illustrating a first variation of the waiting request list. The waiting request list W_list has a plurality of waiting entries for each of the requesters (cores/caches 0 to 3); the number of the waiting entries is the same as the number of the entries in the request port, that is, the waiting request list W_list has eight waiting entries. Therefore, if the same requester makes memory requests to the same address, all the memory requests can be registered in the waiting request list. In FIG. 14, only the ranks of the requesters are registered in the rank information W_rank as in the example in FIG. 7 to allow the ranks to be managed. Alternatively, the occurrence order of all the requests registered in the waiting request list W_list may be registered for management.

However, when the LLCs are provided at a level lower than the level of the coherency control sections and the miss access control section for the LLCs limits each of the cores or caches at the lower level to one memory request with the same address for request to the coherency control section, providing one waiting entry for each requester as in FIG. 7 is sufficient.

FIG. 15 is a diagram illustrating a second variation of the waiting request list. The waiting request list W_list is not configured such that requests are registered for each requester. In the waiting request list W_list, requests with the same address as the monitored address are registered in order of occurrence regardless of the requesters. The number of the entries is desirably as large as possible. The rank information W_rank contains the ranks of all the entries registered in the waiting request list in order of occurrence of the requests for management.

First Variation of the First Embodiment

Figure 16:
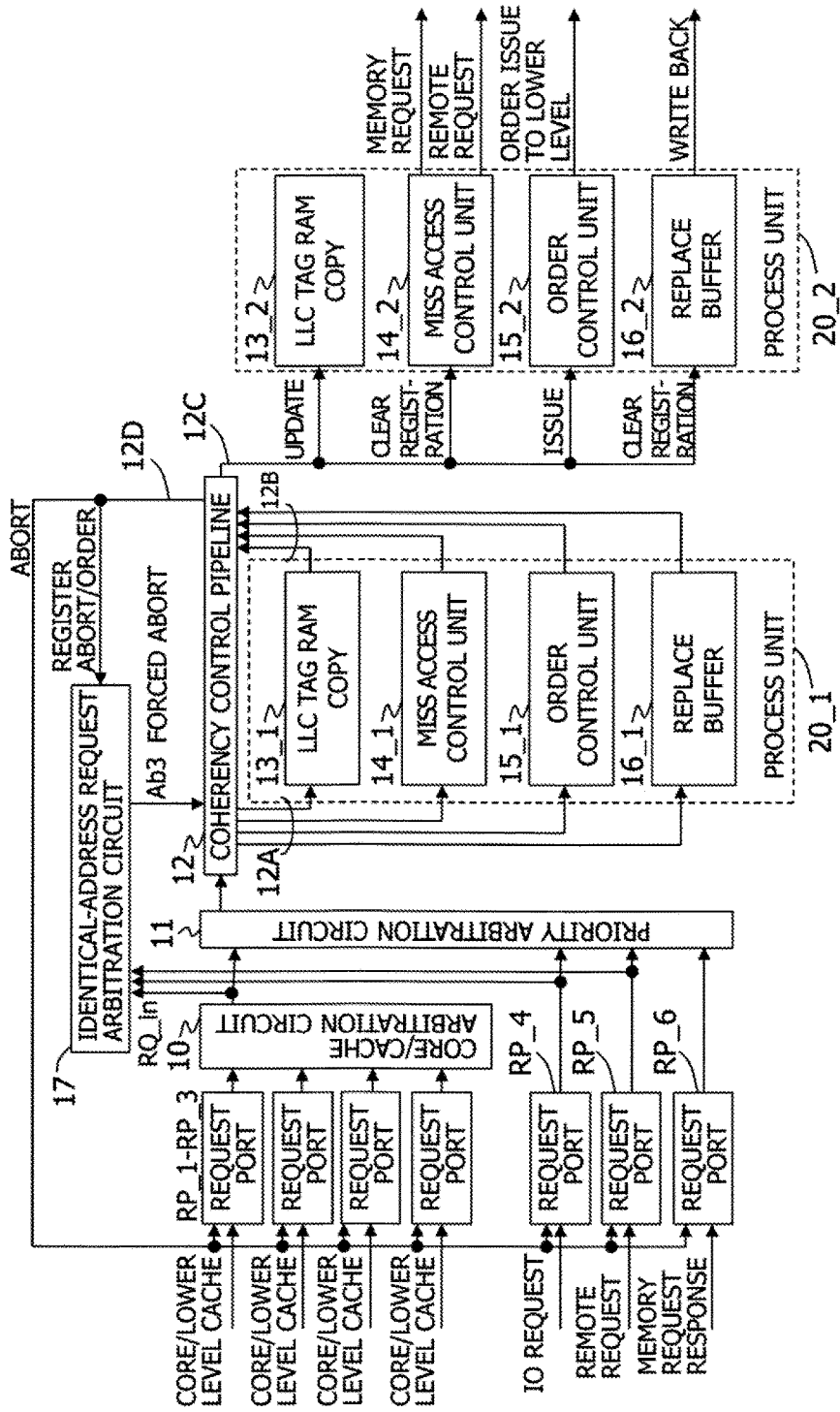
FIG. 16 is a diagram of a coherency control section in a first variation of the first embodiment.

FIG. 16 is a diagram of a coherency control section in a first variation of the first embodiment.

In the coherency control section illustrated in FIG. 5, for requests from the cores or lower-level caches that are output by the inter-core or -cache arbitration circuit 10, the identical-address request arbitration circuit 17 arbitrates requests with the same address as the monitored address.

In contrast, in the coherency control section in the variation illustrated in FIG. 16, the identical-address request arbitration circuit 17 also receives requests output through the request ports RP_4, RP_5, which accept IO requests and remote requests, and also for these requests, arbitrates requests with the same address as the monitored address. Therefore, the arbitration targets of identical-address requests include, in addition to memory access requests from the cores or caches at the lower level, requests from the IO devices corresponding to DMA (Direct Memory Access) and requests entered by the other CPUs via the router.

Second Variation of the First Embodiment

Figure 17:
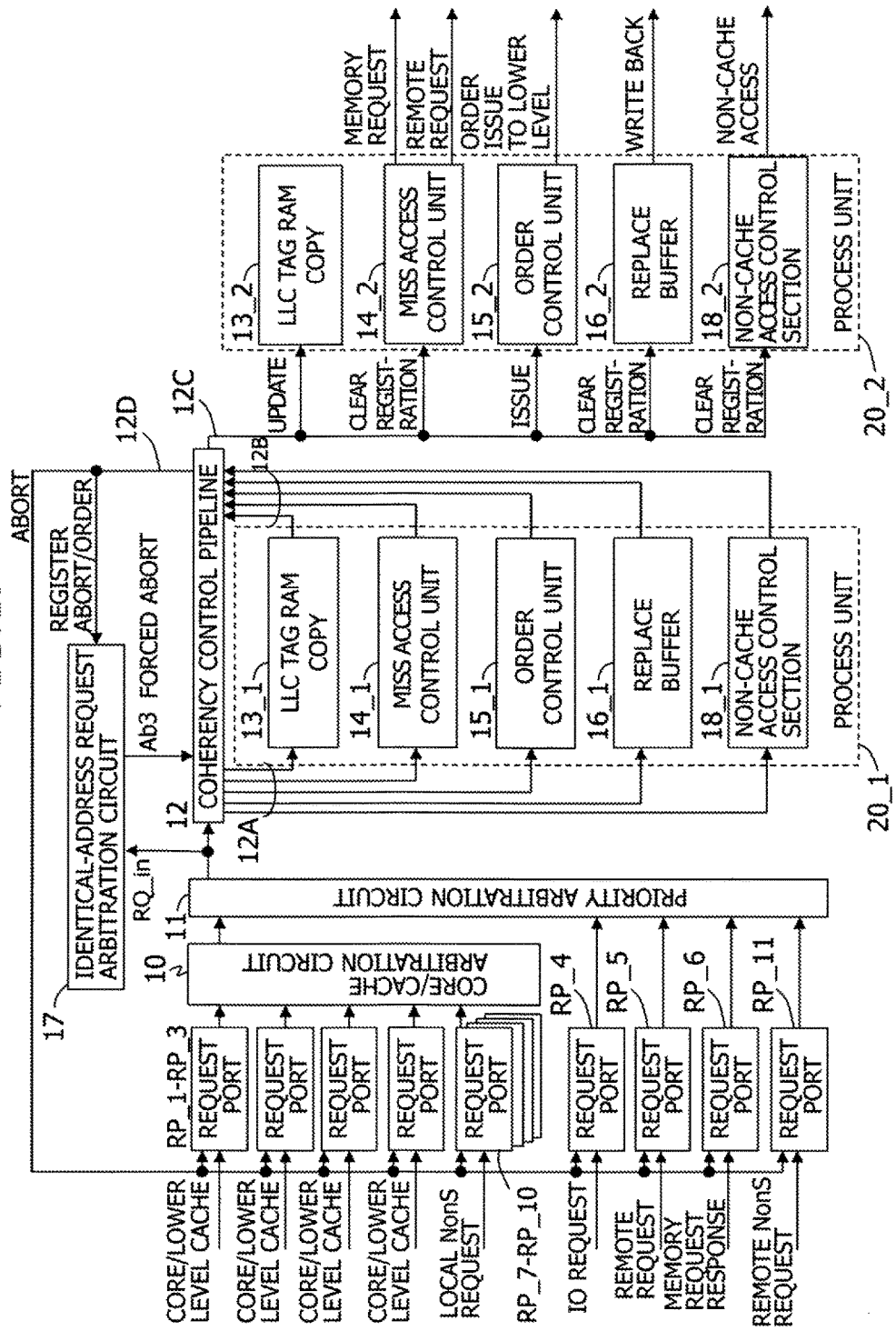
FIG. 17 is a diagram of a coherency control section in a second variation of the first embodiment.

FIG. 17 is a diagram of a coherency control section in a second variation of the first embodiment. In the second variation in FIG. 17, four request ports RP_7 to RP_10 that accept requests to non-cacheable addresses from the local CPU are added to the coherency control section in FIG. 16 for the respective requesters such as the cores. A request port RP_11 that accepts requests to non-cacheable addresses from the remote CPUs is further added to the coherency control section. Non-cache access control sections 18_1, 18_2 are added into the processing circuit unit 20 to process requests to non-cacheable addresses. The identical-address request arbitration circuit 17 receives the input request information RQ_in output by the priority arbitration circuit 11.

As a result, the identical-address request arbitration circuit 17 processes, as monitor targets and arbitration targets, local memory access to a cacheable address that is entered to the request ports RP_0 to RP_3, requests to cacheable addresses output from the IO devices and the remote CPUs and entered through the request ports RP_4, RP_5, and local and remote requests to non-cacheable addresses.

If, like requests to cacheable addresses, requests to non-cacheable addresses compete for the circuit resource in the processing section in the processing circuit unit, the identical-address request arbitration circuit 17 in the configuration in FIG. 17 handles the requests as arbitration targets to allow the non-cache access requests competing for the monitored address to be processed in order of occurrence of the requests.

Second Embodiment

Figure 18:
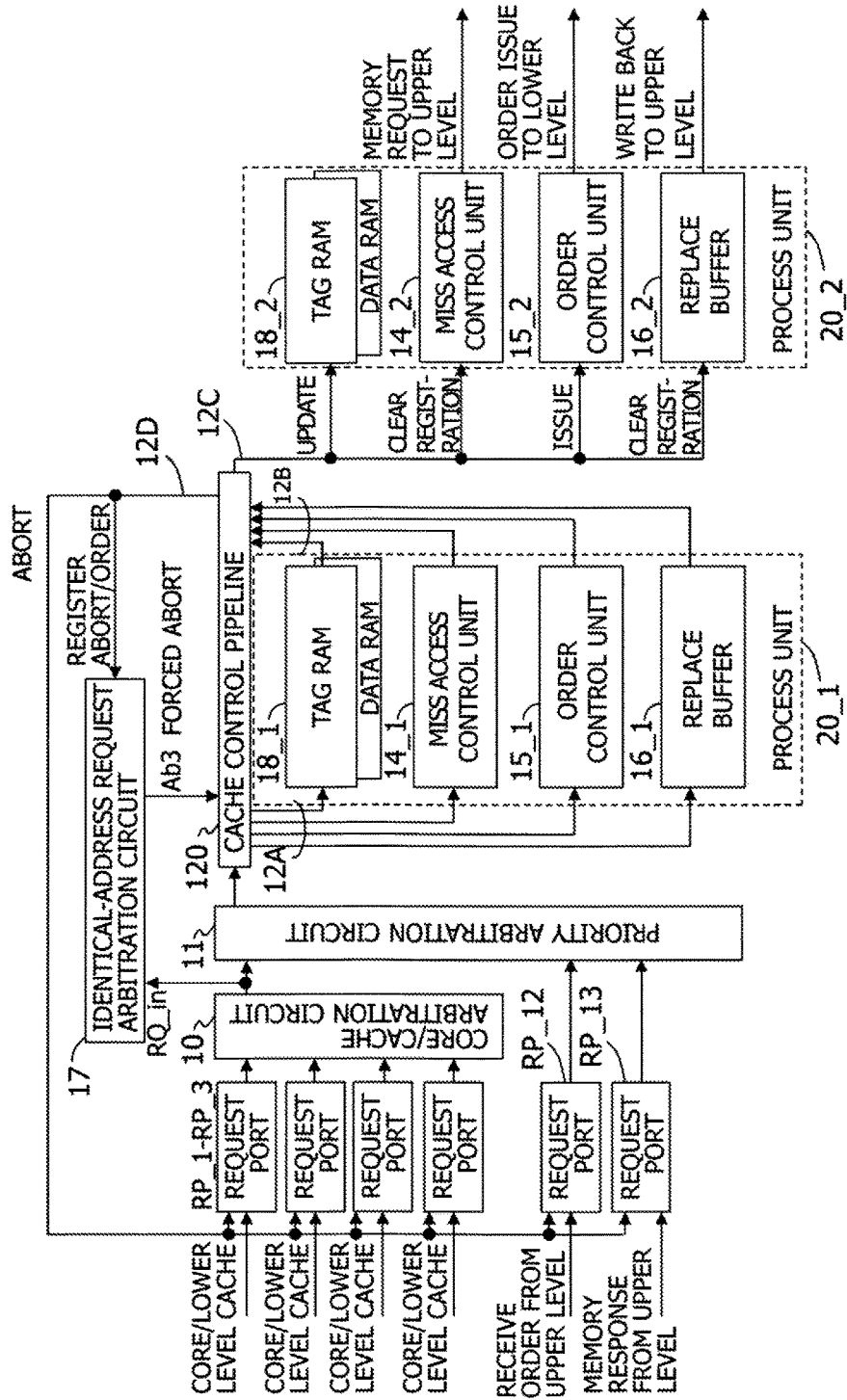
FIG. 18 is a diagram illustrating a configuration of a cache in a second embodiment.

FIG. 18 is a diagram illustrating a configuration of a cache in a second embodiment. The cache is, for example, the LLC (highest-level cache) in FIG. 1 and may be, instead of a last-level cache, a cache at a level lower than the last level.

The coherency control section in the first embodiment in FIG. 5 is provided between the memory layer and the plurality of LLCs and receives memory access issued as a result of a cache miss in any LLC, checks the tag copies in the LLCs, and issues a transfer order to the LLC holding the data if a cache hit occurs in that LLC, while issuing a memory request to the memory layer if a cache miss occurs. Therefore, the coherency control section has the control pipeline that accepts requests from the plurality of lower-level devices to control the memory layer and the processing circuit unit that executes processing corresponding to a request, and is provided with the identical-address request arbitration circuit to appropriately arbitrate a plurality of requests to the same address.

The cache in FIG. 18 has a configuration similar to that of the coherency control section in FIG. 5. However, unlike the coherency control section, the cache has a tag memory 18 and a data memory 19 for a cache memory. In other words, the cache is different from the coherency control section in that the cache has the original tag memory 18 instead of a copy of the tag memory and also has the data memory 19. The cache is also different from the coherency control section in that the cache has a request port RP_12 that accepts orders from the upper level (upper-level caches and coherency control sections) and a request port RP_13 that accepts memory responses from the upper level.

On the other hand, like the coherency control section, the cache has the request port RP, the inter-core or -cache arbitration circuit 10, the priority arbitration circuit 11, and the cache control pipeline 120, and further has the processing circuit unit 20 including the miss access control section 14, the order control section 15, and the replace buffer 16. However, the miss access control section 14 issues memory requests to the upper level (upper-level caches and coherency control sections). The miss access control section 14 in the coherency control section in FIG. 5 not only issues memory requests to the memory layer at the upper level but also issues requests to the remote devices (other CPUs).

Therefore, even in the cache in FIG. 18, requests input to a cache control pipeline 120 may fail to acquire the circuit resource in the processing circuit unit 20 and be aborted or successfully acquire the circuit resource depending on the input timing, leading to unbalanced processing among requests with the same address, as is the case with the coherency control section. Thus, the cache in FIG. 18 has the identical-address request arbitration circuit 17 in order to prevent such unbalanced processing.

A configuration of the cache control pipeline 120 is as illustrated in FIG. 6, and a configuration and functions of the identical-address request arbitration circuit 17 are also as illustrated in FIG. 7, FIG. 8, and FIG. 9. That is, the cache control pipeline 120 checks whether or not an input request can be processed by the processing circuit unit, for example, whether or not the input request conflicts with the exclusive address or whether or not the input request can acquire the circuit resource in the processing circuit unit 20_2.

The identical-address request arbitration circuit 17 holds a memory request in a waiting request list that holds the order in which requests with the same address as the monitored address are input (introduced), until the memory request acquires the circuit resource in the processing circuit unit 20 and has the corresponding processing executed. The identical-address request arbitration circuit 17 thus arbitrates requests with an identical address so that the requests can acquire circuit resources in order of occurrence of the requests.

In the second embodiment, the identical-address request arbitration circuit 17 may have a request port that accepts requests to non-cacheable addresses and a non-cache access control section that executes the corresponding processing, and for requests to non-cacheable addresses in addition to requests to cacheable addresses, the identical-address request arbitration circuit may arbitrate requests to an identical address, as is the case with FIG. 17.

As described above, in the present embodiment, the identical-address request arbitration circuit is provided to allow suppression of unbalance among requests resulting from the controllable determination, in the coherency control pipeline or the cache control pipeline, of whether or not to allow requests with an identical address to acquire the circuit resource. The present embodiment is applied to coherency control sections and caches (LLCs or caches at a different level).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device comprising:

a plurality of arithmetic processing cores;

a shared cache shared by the plurality of arithmetic processing cores; and a first control circuit that controls a memory, wherein the first control circuit includes:

a request port that accepts a request for a memory space in the memory, wherein the request port includes a first request port that accepts a request from the shared cache;

a processing circuit unit that executes processing corresponding to the request;

a control pipeline that determines whether or not the processing is executable by the processing circuit unit on the request input through the request port, and that executes first abort processing for the request when the processing is not executable on the request, and issues the processing to the processing circuit unit when the processing is executable; and an identical-address request arbitration circuit that holds an occurrence order of requests with an identical address that is aborted due to the processing being not executable, and that executes second abort processing on those of requests input to the control pipeline which have the identical address and which are other than a leading request in the occurrence order.

2. The arithmetic processing device according to claim 1, further comprising:

a coherency control section that controls coherency of the shared cache, wherein the coherency control section includes the first control circuit.

3. The arithmetic processing device according to claim 2, wherein the request port further includes one or both of a second request port that accepts a request to a cacheable address from any other circuit than the shared cache and a third request port that accepts a request to a non-cacheable address.

4. An arithmetic processing device comprising:
a plurality of arithmetic processing cores; and
a shared cache shared by the plurality of arithmetic processing cores, the shared cache includes:
   a request port that accepts a request for a memory space in the memory, the request port includes a first request port that accepts the request from a lower-level cache;
   a processing circuit unit that executes processing corresponding to the request;
   a control pipeline that determines whether the processing is executable by the processing circuit unit on the request input through the request port, and that executes first abort processing for the request when the processing is not executable on the request, and issues the processing to the processing circuit unit when the processing is executable; and
   an identical-address request arbitration circuit that holds an occurrence order of requests with an identical address that is aborted due to the processing being not executable, and that executes second abort processing on those of requests input to the control pipeline which have the identical address and which are other than a leading request in the occurrence order.

5. The arithmetic processing device according to claim 4, wherein the request port further includes a third request port that accepts a request to a non-cacheable address.

6. The arithmetic processing device according to claim 1, wherein the control pipeline determines whether or not the processing is executable, based on whether or not an address of the request input through the request port conflicts with an address of the request being processed by the processing circuit unit.

7. The arithmetic processing device according to claim 1, wherein the control pipeline determines whether or not the processing is executable, based on whether or not the request input through the request port is able to acquire a circuit resource in the processing circuit unit needed for the processing is acquirable.

8. The arithmetic processing device according to claim 1, wherein the request port is provided for each of requesters of the requests, and
the identical-address request arbitration circuit holds the occurrence order in order of the requesters.

9. The arithmetic processing device according to claim 8, wherein the identical-address request arbitration circuit includes a monitored address holding section that holds the identical address, a waiting request list that holds request information on at least one of the aborted requests for each of the requesters, and an order information holding section that indicates the occurrence order of the requesters.

10. The arithmetic processing device according to claim 1, wherein the identical-address request arbitration circuit holds the occurrence order for each of a plurality of the identical addresses and executes the second abort processing on each of the plurality of the identical addresses.

11. The arithmetic processing device according to claim 2, wherein the processing circuit unit in the coherency control section includes:
   a copy of a tag memory in a lower-level cache memory; and
   at least one of:
   a miss access control section that issues an access request to an upper level in a memory direction corresponding to the request and that accepts no succeeding request with the identical address until a response to the access request is received from the memory;
   an order control section that issues a processing order to a lower level opposite to the memory direction corresponding to the request and that accepts no succeeding request with the identical address until the processing order is completed; and
   a replace buffer that issues a request to write data pushed out of a cache at the lower level back to the memory and that accepts no succeeding request with the identical address until the write-back is completed.

12. The arithmetic processing device according to claim 4, wherein the processing circuit unit in the shared cache includes:
   a tag memory and a data memory in a cache memory of the processing circuit unit; and
   at least one of:
   a miss access control section that issues an access request to an upper level in a memory direction corresponding to the request and that accepts no succeeding request with the identical address until a response to the access request is received from the memory;
   an order control section that issues a processing order to a lower level opposite to the memory direction corresponding to the request and that accepts no succeeding request with the identical address until the processing order is completed; and
   a replace buffer that issues a request to write data pushed out of a cache at the lower level back to the memory and that accepts no succeeding request with the identical address until the write-back is completed.

13. A method of controlling an arithmetic processing device which includes a plurality of arithmetic processing cores, a shared cache shared by the plurality of arithmetic processing cores, and a first control circuit that controls a memory, the first control circuit including a control pipeline, an identical-address request arbitration circuit, a request port that accepts a request for a memory space in the memory, and a processing circuit unit that executes processing corresponding to the request, the method comprising;
   the control pipeline determining whether or not the processing is executable by the processing circuit unit on the request input through the request port, executing first abort processing for the request when the processing is not executable on the request, and issuing the processing to the processing circuit unit when the processing is executable; and
   the identical-address request arbitration circuit holding an occurrence order of requests with an identical address that is aborted due to the processing being not executable, and executing second abort processing on those of requests input to the control pipeline which have the identical address and which are other than a leading request in the occurrence order;
   wherein the request port includes a first request port that accepts a request from the shared cache.

14. A method of controlling an arithmetic processing device which includes a plurality of arithmetic processing cores, and a shared cache shared by the plurality of arithmetic processing cores, the shared cache including a control pipeline, an identical-address request arbitration circuit, a request port that accepts a request for a memory space in the memory and includes a first request port that accepts the request from a lower-level cache, and a processing circuit unit that executes processing corresponding to the request, the method comprising;

the control pipeline determining whether the processing is executable by the processing circuit unit on the request input through the request port, executing first abort processing for the request when the processing is not executable on the request, and issuing the processing to the processing circuit unit when the processing is executable; and the identical-address request arbitration circuit holding an occurrence order of requests with an identical address that is aborted due to the processing being not executable, and executing second abort processing on those of requests input to the control pipeline which have the identical address and which are other than a leading request in the occurrence order.

\* \* \* \* \*